US007653565B2

(12) United States Patent
Fukui et al.

(10) Patent No.: US 7,653,565 B2
(45) Date of Patent: Jan. 26, 2010

(54) PROCESSING PROGRAM EDITION CONFERENCING METHOD AND SYSTEM

(75) Inventors: Yukio Fukui, Isehara (JP); Koichi Tsuchida, Isehara (JP)

(73) Assignee: Amada Company, Limited, Kanagawa (JP)

( * ) Notice: Subject to any disclaimer, the term of this patent is extended or adjusted under 35 U.S.C. 154(b) by 851 days.

(21) Appl. No.: 10/767,331

(22) Filed: Jan. 30, 2004

(65) Prior Publication Data

US 2004/0186759 A1 Sep. 23, 2004

Related U.S. Application Data

(63) Continuation of application No. PCT/JP02/07738, filed on Jul. 30, 2002.

(30) Foreign Application Priority Data

Jul. 31, 2001 (JP) .............................. 2001-231837

(51) Int. Cl.
G06F 17/60 (2006.01)
G06F 3/00 (2006.01)
G06F 15/16 (2006.01)
G06F 19/00 (2006.01)
(52) U.S. Cl. ..................... 705/8; 715/729; 715/751; 709/201; 700/97
(58) Field of Classification Search .............. None
See application file for complete search history.

(56) References Cited

U.S. PATENT DOCUMENTS 5,552,995 A * 9/1996 Sebastian ..................... 700/97
5,822,206 A * 10/1998 Sebastian et al. ............. 700/97
5,844,553 A * 12/1998 Hao et al. .................... 715/733

(Continued)

FOREIGN PATENT DOCUMENTS

JP 11-195062 7/1999

(Continued)

OTHER PUBLICATIONS

English Language Abstract of JP11-282799.

(Continued)

Primary Examiner—F. Zeender
Assistant Examiner—Mussa Shaawat
(74) Attorney, Agent, or Firm—Greenblum & Bernstein, P.L.C.

(57) ABSTRACT

An initial contractor (5) that receives a request from an ordering customer (3) to manufacture a product performs a process edition conference via an outsourcing service using a computer (11) of the initial contractor. The initial contractor (5) receives a request from an ordering customer (3) to manufacture a sheet metal product. For manufacturing the product, the initial contractor (5) performs a processing edition conference to decide the method for processing the product and to estimate the price required and the delivery schedule. In the performance of the processing edition conference, the initial contractor (5) requests the services of an outsourcing service center (7). A CAD/CAM operator of the outsourcing service center (7) logs in to a computer (11) of the initial contractor from a computer (13) of the outsourcing service center, such that the operator participates in the processing edition conference while operating the computer (11) of the initial contractor, so that the processing method, price estimate and delivery schedule are decided by work performed on the computer (11) of the initial contractor.

17 Claims, 20 Drawing Sheets

U.S. PATENT DOCUMENTS

| | | | | |
|---|---|---|---|---|
| RE36,602 E | * | 3/2000 | Sebastian et al. | 700/97 |
| 6,295,513 B1 | * | 9/2001 | Thackston | 703/1 |
| 6,343,313 B1 | * | 1/2002 | Salesky et al. | 709/204 |
| 6,584,493 B1 | * | 6/2003 | Butler | 709/204 |
| 6,614,430 B1 | * | 9/2003 | Rappoport | 345/420 |
| 6,828,963 B1 | * | 12/2004 | Rappoport | 345/419 |
| 7,003,371 B2 | * | 2/2006 | Tsuchida et al. | 700/182 |
| 7,099,803 B1 | * | 8/2006 | Rappoport et al. | 703/1 |
| 2003/0177024 A1 | | 9/2003 | Tsuchida et al. | |
| 2005/0034079 A1 | * | 2/2005 | Gunasekar et al. | 715/753 |

FOREIGN PATENT DOCUMENTS

| | | |
|---|---|---|
| JP | 11-282799 | 10/1999 |
| JP | 2001-075626 | 3/2001 |
| WO | 01/50307 | 7/2001 |
| WO | WO0217148 A1 * | 2/2002 |

OTHER PUBLICATIONS

English Language Abstract of JP 11-195062.
English Language Abstract of JP 2001-075626.

* cited by examiner

FIG.15

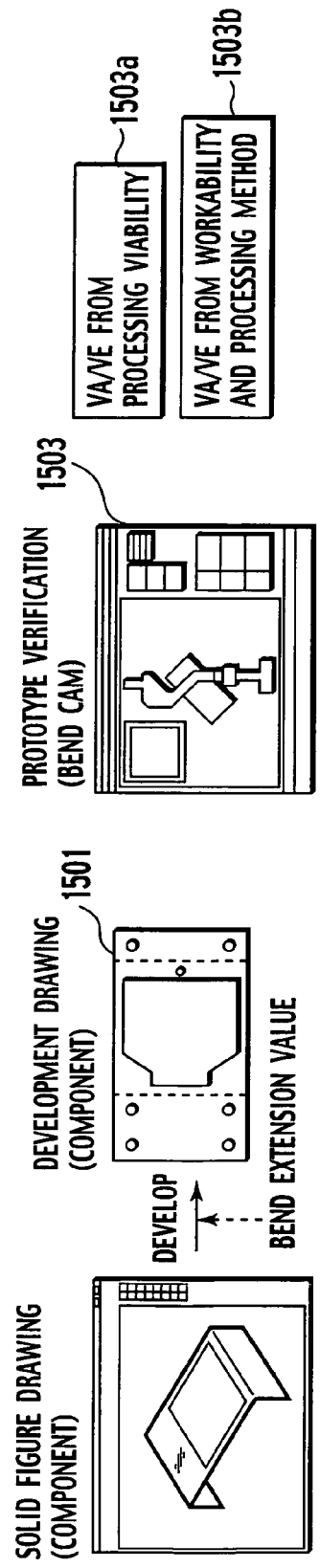
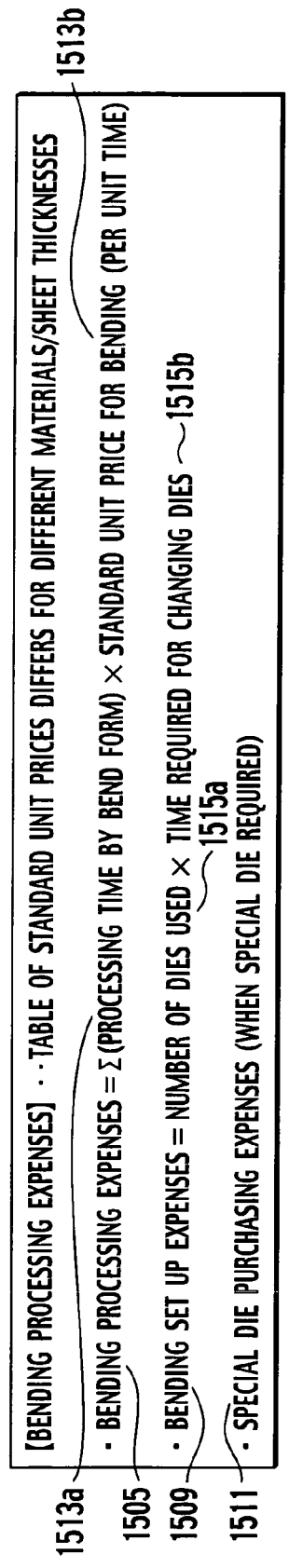
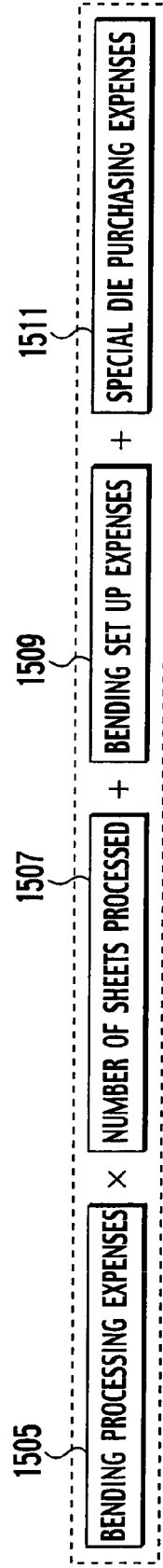

SOLID FIGURE DRAWING (COMPONENT)

DEVELOP → DEVELOPMENT DRAWING (COMPONENT) 1501

BEND EXTENSION VALUE

PROTOTYPE VERIFICATION (BEND CAM) 1503

VA/VE FROM PROCESSING VIABILITY 1503a

VA/VE FROM WORKABILITY AND PROCESSING METHOD 1503b

[BENDING PROCESSING EXPENSES]···TABLE OF STANDARD UNIT PRICES DIFFERS FOR DIFFERENT MATERIALS/SHEET THICKNESSES — 1513b

1513a — · BENDING PROCESSING EXPENSES = Σ(PROCESSING TIME BY BEND FORM) × STANDARD UNIT PRICE FOR BENDING (PER UNIT TIME)
1505 — · BENDING SET UP EXPENSES = NUMBER OF DIES USED × TIME REQUIRED FOR CHANGING DIES — 1515b
1509 — 1515a
1511 — · SPECIAL DIE PURCHASING EXPENSES (WHEN SPECIAL DIE REQUIRED)

[ BENDING PROCESSING EXPENSES × NUMBER OF SHEETS PROCESSED + BENDING SET UP EXPENSES + SPECIAL DIE PURCHASING EXPENSES ]

1505     1507     1509     1511

PROCESSING PROGRAM EDITION CONFERENCING METHOD AND SYSTEM

CROSS REFERENCE TO RELATED APPLICATIONS

This is a continuation of International Application No. PCT/JP02/07738, with an international filing date of Jul. 30, 2002, the entire contents of which are incorporated by reference herein in its entirety.

BACKGROUND OF THE INVENTION

1. Field of the Invention

The present invention relates to a method and a system for conferencing concerning processes for sheet metal work. More specifically, the present invention relates to a method and a system for a conference between parties compiling and performing processes for sheet metal work, that involves utilizing an outsourcing service that uses IT to perform a virtual simulation of production of a product by remote means, before the product is produced.

2. Description of Relevant Art

Generally, outsourcing business for sheet metal firms doing sheet metal work, such as the work of operating CAD/CAM systems provided by the sheet metal factory itself, involves dispatching operating staff to that customer, with those staff utilizing the resources, such as computers, of that customer. This kind of outsourcing business is a manpower dispatch type operation.

On the other hand, outsourcing services for work performed by a party receiving an order to perform work based on electronic data of drawings from the party ordering the work (the ordering customer), such as making an estimate, producing development drawings, producing a program for a process or the like, or even making proposals when results of such work are submitted, are often performed at an outsourcing service center with communications taking place via the Internet for example.

There are problems affecting the conventional outsourcing service industry however.

An issue facing such a party receiving an order to perform work, (i.e. an initial contractor performing sheet metal related work for an ordering customer) is that a programmer is too pressed for time and therefore the company president, factory manager, an experienced sheet metal bending engineer and a programmer are almost impossible to conference together on the side of that initial contractor, concerning the edition of the processes required to perform the sheet metal work.

Further, an issue facing those on the side of the outsourcing service center, is that when they wish to conference on the processing edition using CAD/CAM equipment of their customer (the party receiving the order i.e. the initial contractor), a problem arises due to being separated by physical distance. Moreover, when, due to a product deadline for example, the work performed by the processing program edition conferencing must be performed swiftly, time constraints can be challenging.

SUMMARY OF THE INVENTION

With such problems in view, the present invention proposes a processing program edition conferencing method that enables an initial contractor that receives a request to manufacture a sheet metal product, to have virtual examination of the manufacturing work for that sheet metal product using their own computer, which method preferably comprises the steps of:

a computer of the initial contractor prompting a computer of an outsourcing service center to login to the computer of the initial contractor;

the computer of the outsourcing center logging in to the computer of the initial contractor; and the computer of the outsourcing center thus logged in to the computer of the initial contractor operating the computer of the initial contractor based on instructions related to the processing edition conference from the initial contractor.

Further, it is preferable that the operation of the computer of the initial contractor in connection with the processing edition conference includes a step of creating a control program for a NC machine tool for producing the sheet metal product.

Again, it is preferable that the operation of the computer of the initial contractor in connection with the processing edition conference includes a step of calculating an estimate for the product.

Moreover, it is preferable to include a step of accumulating data obtained by the operation of the computer of the initial contractor in connection with the processing edition conference, in memory of the computer of the initial contractor.

Further, it is preferable to include a step of accumulating data obtained by the operation of the computer of the initial contractor in connection with the processing edition conference, in memory of the computer of the outsourcing service center.

Again, the present invention proposes a processing program edition conferencing system that enables an initial contractor that receives a request to manufacture a sheet metal product, to have a virtual examination of the manufacturing work for the sheet metal product using their own computer, which system preferably include:

means of computer of the initial contractor for prompting a computer of an outsourcing service center to login to the computer of the initial contractor;

means of computer of the outsourcing center for logging in to the computer of the initial contractor; and means of computer of the outsourcing center logged in to the computer of the initial contractor for operating the computer of the initial contractor based on instructions related to the processing edition conference from the initial contractor.

BRIEF DESCRIPTION OF THE DRAWINGS

FIG. 15 is an explanatory drawing on calculation of expenses for bending processing work.

BEST MODE FOR CARRYING OUT THE INVENTION

Figure 1:
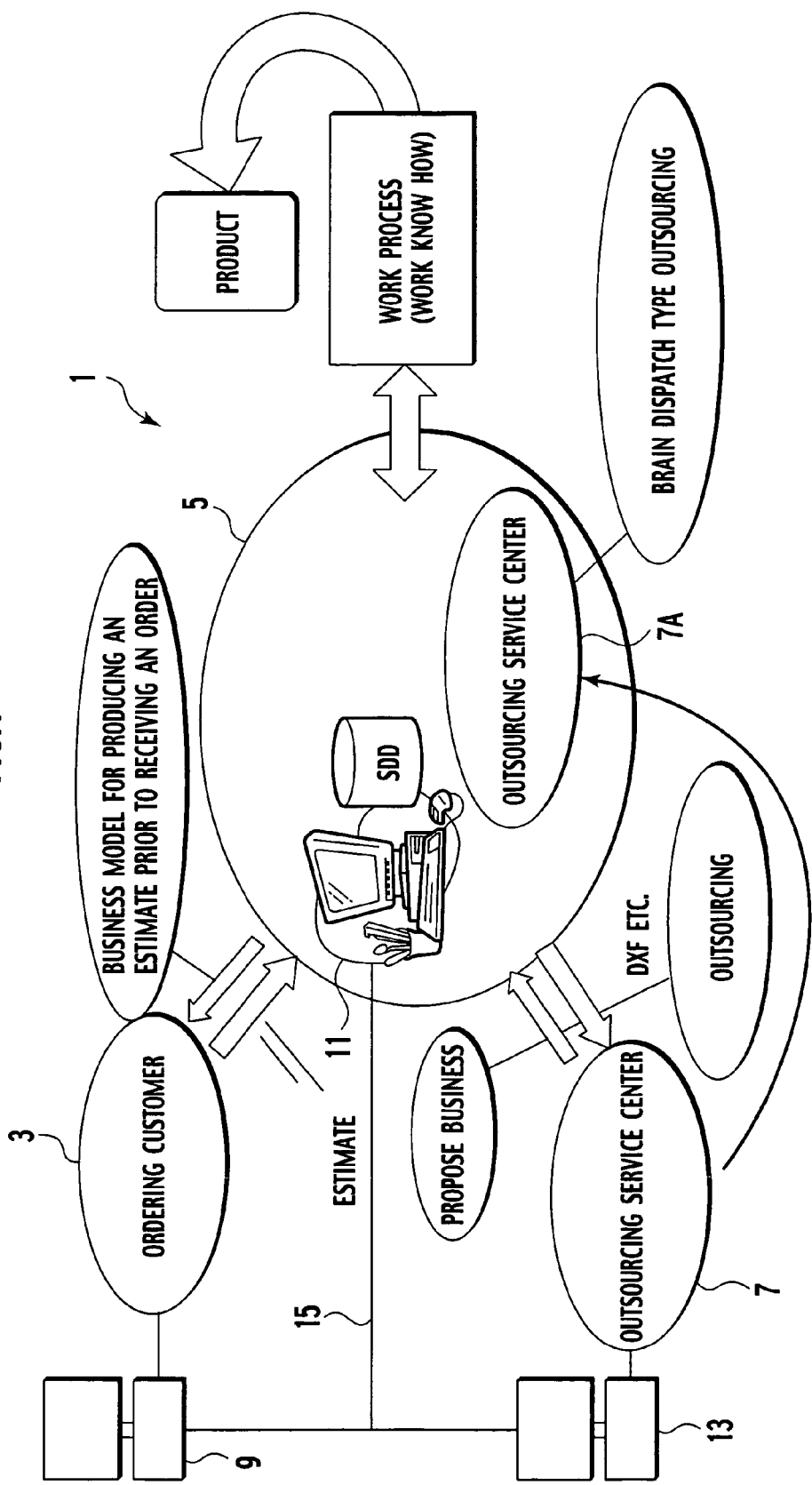
FIG. 1 is a schematic view of a processing program edition conferencing system.
Figure 2:
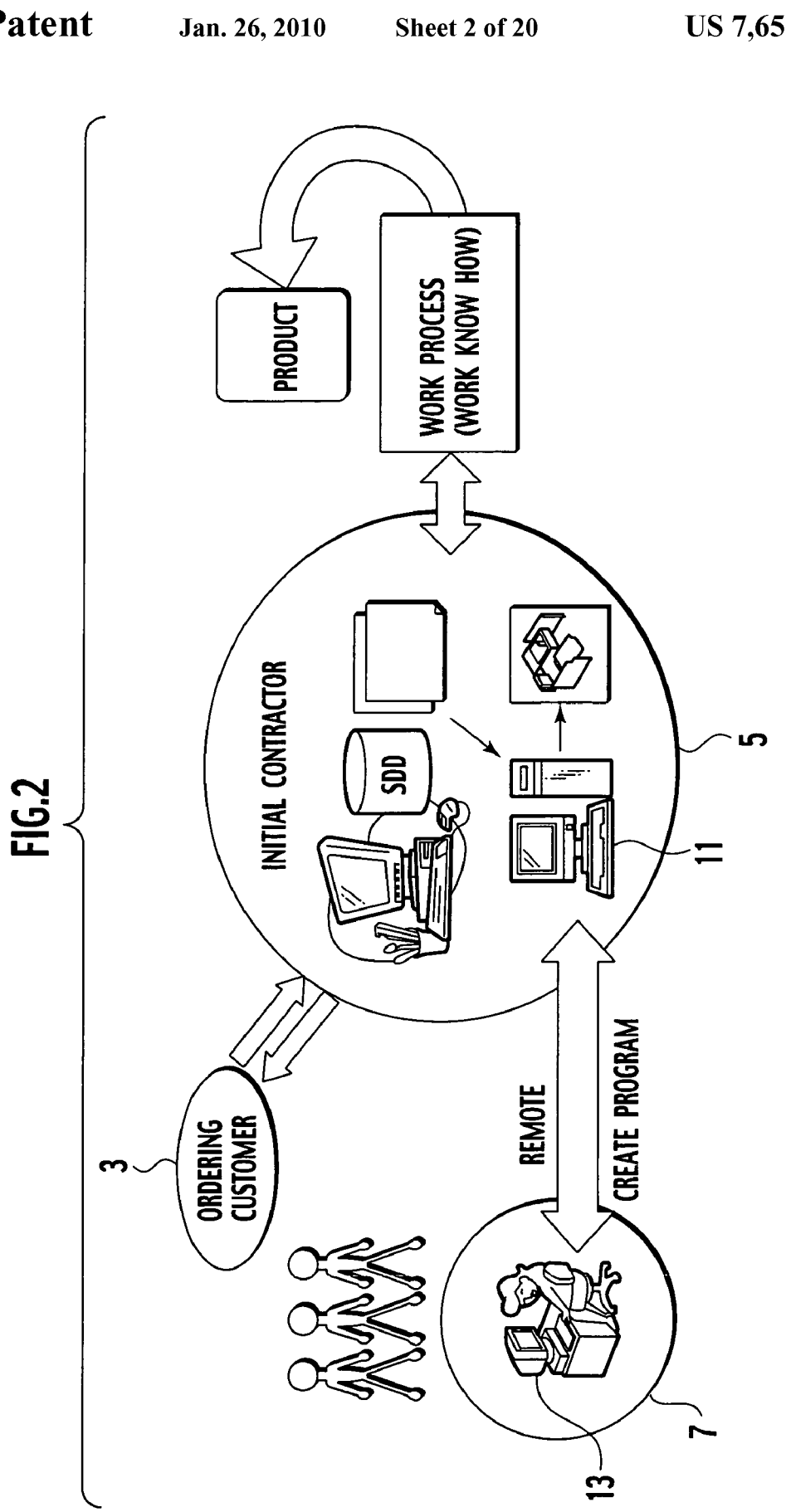
FIG. 2 is another schematic view of the processing program edition conferencing system.
Figure 3:
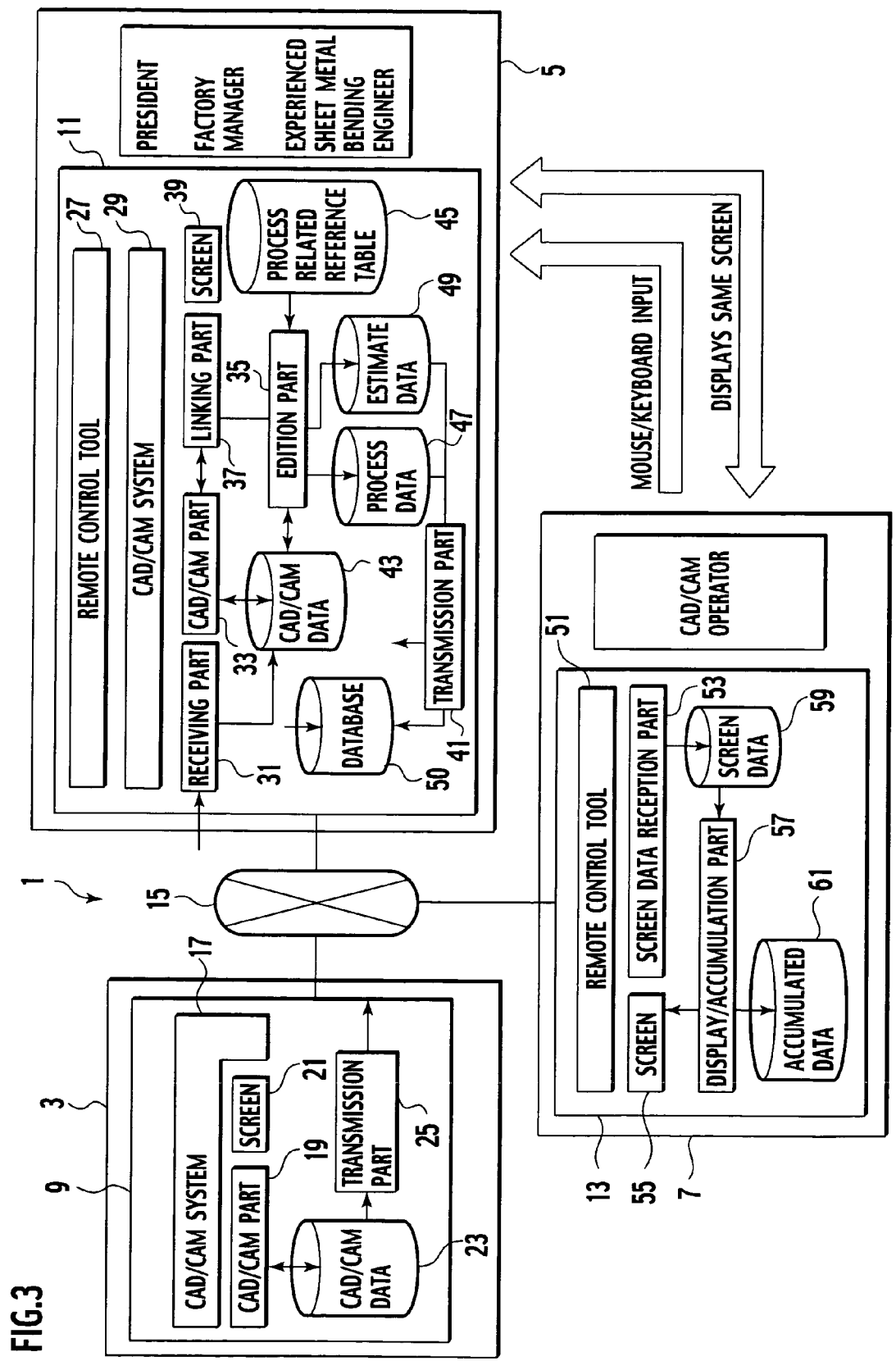
FIG. 3 is still another schematic view of the processing program edition conferencing system.

An embodiment of the present invention will now be described with reference to the drawings. FIGS. 1 to 3 schematically depict a processing program edition conferencing system 1 related to this embodiment.

As shown in FIG. 1, in this example the order receiving party (hereinafter the "initial contractor") is a sheet metal work contracting factory carrying out processes related to sheet metal products. Further, the processing program edition conferencing of this example includes performing a work outsourced from an initial contractor 5 using a computer 13 of an outsourcing service center that logs into a computer 11 of the initial contractor, which work includes virtual product design, NC data creation, production of an estimate prior to receiving a formal production order or the like before actual production of the sheet metal product.

The processing program edition conferencing system 1 comprises an originator of an order 3, (hereinafter "ordering customer 3") that issues a request about production of a sheet metal product, the initial contractor 5 that accepts the request from the ordering customer 3 about producing the sheet metal product and an outsourcing service center 7 that subcontracts to perform part of the work of the initial contractor 5.

The ordering customer 3 has their computer, the computer 9 of the ordering customer, the initial contractor 5 has their computer, the computer 11 of the initial contractor, and the outsourcing service center has their computer, the computer 13 of the outsourcing service center.

The computer 9 of the ordering customer, computer 11 of the initial contractor and computer 13 of the outsourcing service center are able to communicate via a communications system 15 such as the Internet or the like.

A characteristic of the processing program edition conferencing system 1 of this example is that the outsourcing service center 7 can log into the computer 11 of the initial contractor so that the logged in computer 11 can be operated in accordance with instructions of the initial contractor 5, virtually performing a variety of services such as creating a processing program or preparing a pre-order estimate, prior to actual sheet metal product manufacturing work performed by the initial contractor 5. This arrangement enables a bringing together of the know how concerning high-level CAD/CAM systems of the outsourcing service center 7 and the know how on creating a product on the side of the initial contractor 5.

Further, participants in the processing edition conference from the initial contractor 5 (for example, the president of the firm, the factory manager, an experienced sheet metal working engineer) can convey and exchange information with a CAD/CAM operator from the outsourcing service center 7. For example, the participants and CAD/CAM operator can convey their respective thoughts to each other using audio information (for example, using mobile telephones). This enables both sides in the arrangement to mutually perform the required work together. That is to say, the arrangement works such that it is just as if the outsourcing service center 7 is being provided directly to the initial contractor 5 (a brainpower dispatch type outsourcing 7A).

As shown in FIG. 2, another characteristic of the processing program edition conferencing system 1 of this example is that a CAD/CAM system of the computer 11 of the initial contractor can be remotely controlled using a remote control tool (for example, pcAnywhere), so that NC data can be created for a NC machine tool (such as a laser processing machine, NC turret punch press or bending machine or the like) from product drawings. This enables the various functions of the CAD/CAM system to be utilized to the maximum, given that it is very difficult for an ordinary user to become proficient at using all the functions.

A detailed description of this processing program edition conferencing system 1 will now be described with reference to FIG. 3. As described above, the processing program edition conferencing system 1 includes a computer 9 of the ordering customer, a computer 11 of the initial contractor and a computer 13 of the outsourcing service center.

The computer 9 of the ordering customer comprises a CAD/CAM system 17, a CAD/CAM part 19 that performs CAD/CAM operations, a CAD/CAM data memory 23 that stores CAD/CAM data, and a screen 21 that displays CAD drawings and the like. Moreover, CAD/CAM data for the sheet metal product production of which is the subject of the request, is transmitted to the computer 11 of the initial contractor by a transmission part 25.

The computer 11 of the initial contractor comprises a remote control tool 27 that enables remote control from the computer 13 of the outsourcing service center, a CAD/CAM system 29, a receiving part 31 for receiving CAD/CAM data transmitted from the computer 9 of the ordering customer, a CAD/CAM part 33, a edition/editing part 35 for reading in CAD/CAM data and producing process data or estimate data, a linking part 37 for linking between the CAD/CAM part 33 and the edition part 35, a screen 39, and a transmission part 41 for storing the process data and estimate data in a database 50 and transmitting that data to the prescribed memory. Moving/dynamic images on screen, remotely controlled and displayed thereon, are accumulated in the database 50, thus enabling the initial contractor 5 to accumulate sheet metal production know how.

CAD/CAM data is stored in a CAD/CAM data memory 43. Data required for calculating the processing time required and processing expenses is stored in a process related reference table 45. NC data for a NC machine is housed in a process data memory 47. Estimate related data including data for price estimates and production delivery schedules and the like is stored in an estimate data memory 49.

The computer 13 of the outsourcing service center comprises a remote control tool 51 that enables display of the same image as that displayed on the screen of the computer 11 of the initial contractor, a screen data reception part 53 for receiving data for the image being displayed on the screen (screen data) of the computer 11 of the initial contractor, and a display/accumulation part 57 that displays an image from the screen data on a screen 55 and has a function for accumulating data related to that screen data.

Screen data received is stored in a screen data memory 59 and data related to screen data is stored in an accumulated data memory 61. Thus, a broad range of the know how of the initial contractor 5 on sheet metal manufacturing work is accumulated in the computer 13 of the outsourcing service center.

The operations of the processing program edition conferencing system 1 will now be described with reference to FIGS. 4 to 22.

Figure 4:
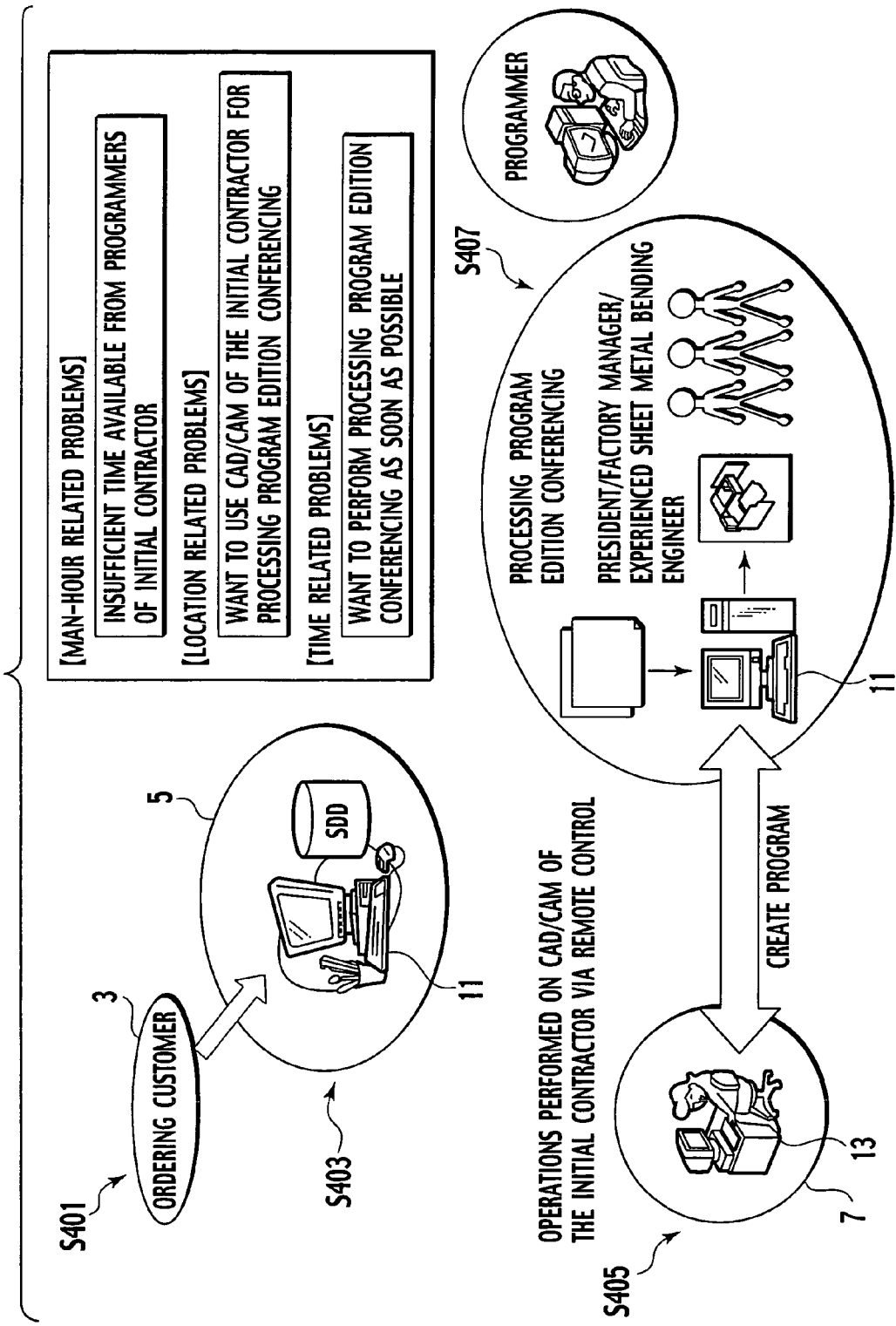
FIG. 4 is a flowchart showing the operations of the processing program edition conferencing system.

As shown in FIG. 4, in step S401 the ordering customer 3 makes a product production request (including an estimate) to the initial contractor 5. At this time, the ordering customer 3 also transmits electronic drawings such as a trihedral figure of the product and the like.

In step S403, the initial contractor 5 confirms the product production request and receives the trihedral figure of the product in the electronic drawings, and moreover, the initial contractor 5 issues a request for services to the outsourcing service center 7.

In step S405, the outsourcing service center 7 performs the services based on the request therefor issued by the initial contractor 5.

In step S407, the computer 13 of the outsourcing service center logs into the computer 11 of the initial contractor and the computer 11 of the initial contractor is operated in accordance with instructions issued at the side of the initial contractor 5. This arrangement enables a processing edition conference occurring within the sphere of the initial contractor 5.

A more detailed explanation of the operations of this processing program edition conferencing system 1 will now be described with reference to FIGS. 5 to 20.

Figure 5:
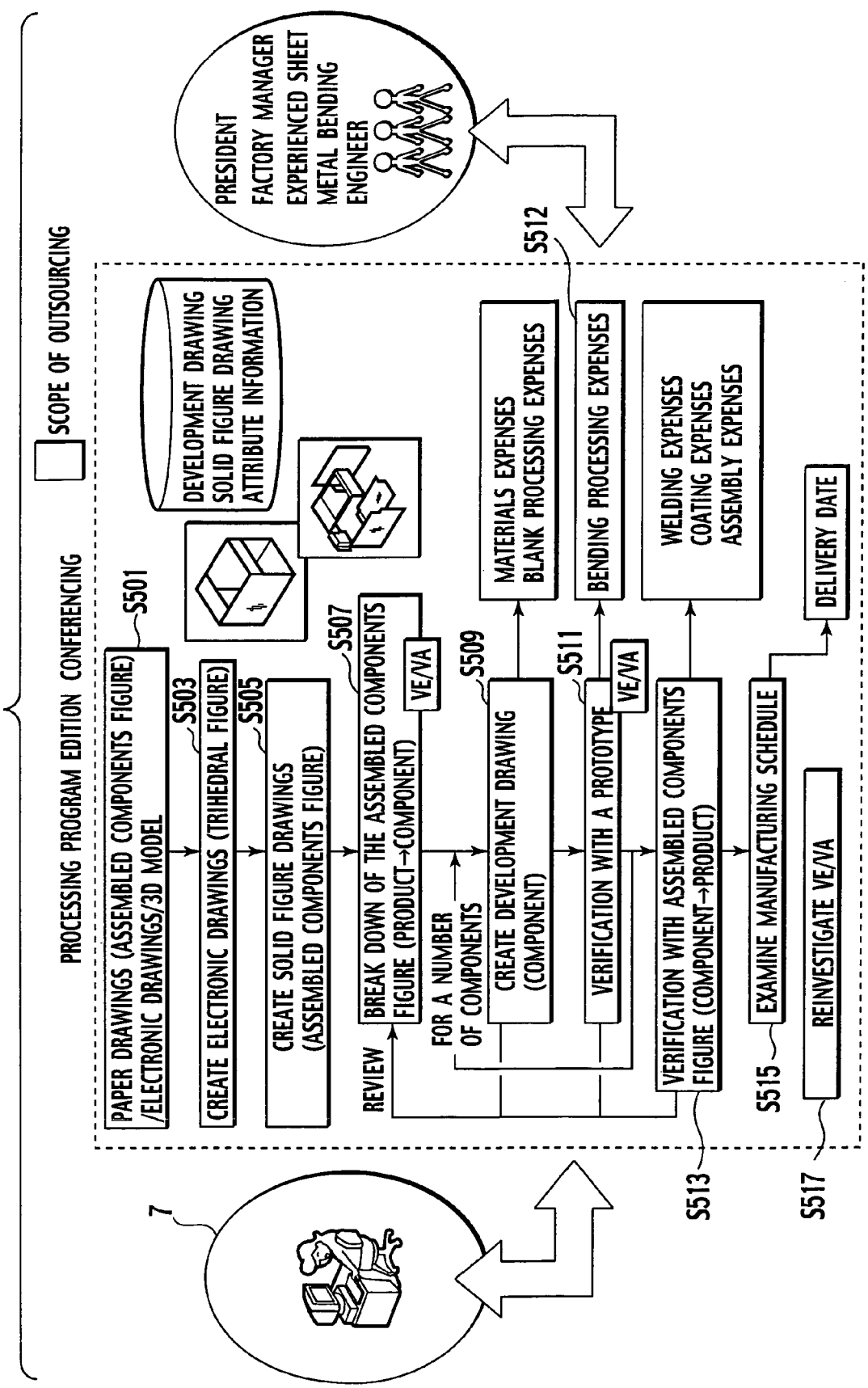
FIG. 5 is another flowchart showing the operations of the processing program edition conferencing system.

The following processes, shown in FIG. 5, are performed by the CAD/CAM part 33 (that is linked to the edition part 35), remotely controlled from the computer 13 of the outsourcing service center; this remotely controlled operation being performed based on instructions issued from the initial contractor 5. These processes include operations to create a control program for a NC machine tool and to produce an estimate.

In step S501, the initial contractor 5 takes transfer from the ordering customer 3, of a paper drawing providing drafts of the product, electronic drawing of the product created by CAD, three-dimensional CAD data modeling the product using three-dimensional CAD, or the like, and receives a request to produce an estimate.

Figure 6:
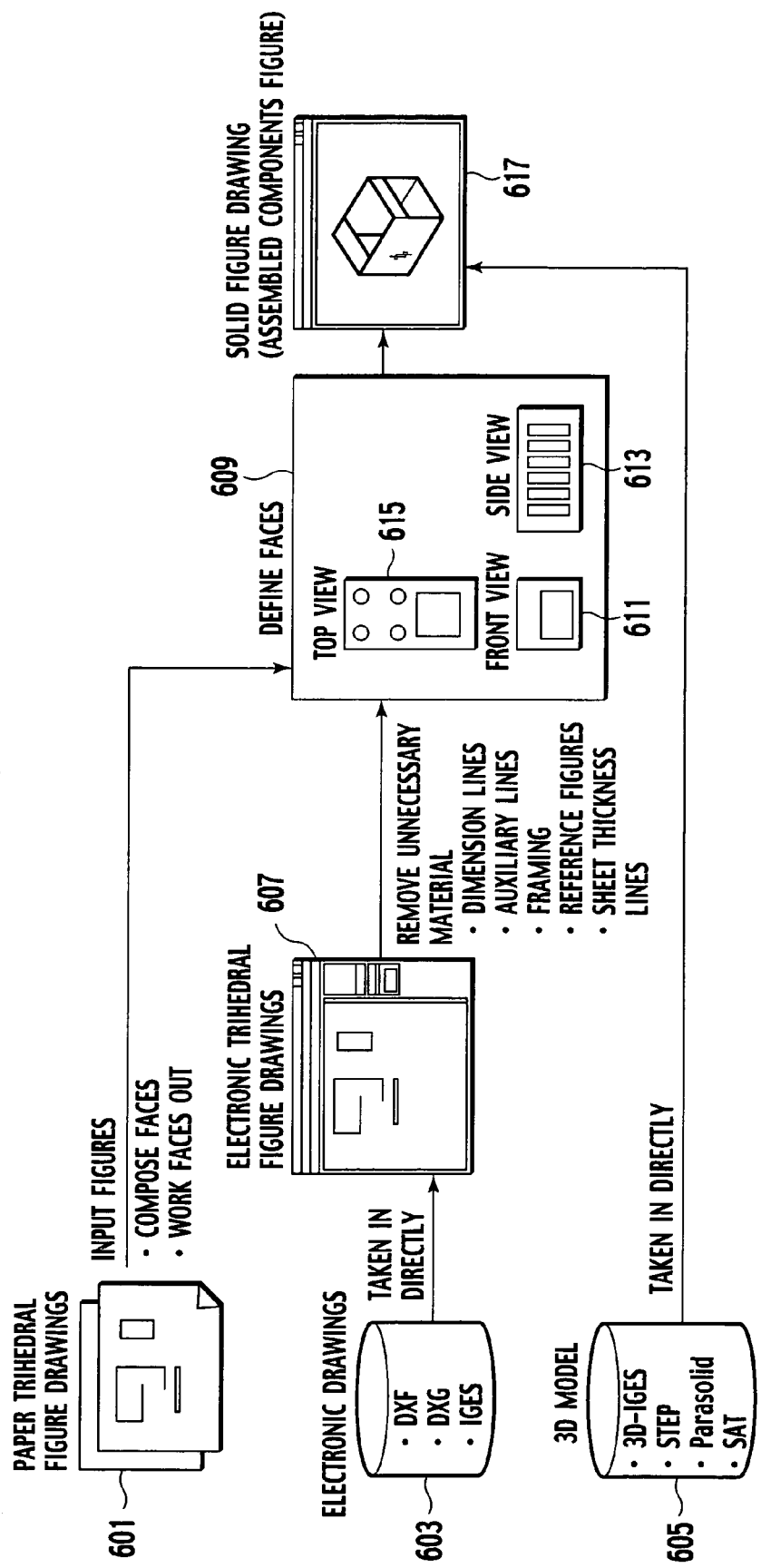
FIG. 6 is an explanatory drawing of a method for making a solid figure drawing from a trihedral figure.

FIG. 6 shows the kinds of drawings which the initial contractor 5 receives from the ordering customer 3. That is to say, the initial contractor 5 may receive a paper trihedral figure drawing 601, an electronic drawings 603 or a 3-D model 605. The processes performed to produce a solid figure drawing from the material received from the ordering customer 3 differ according to the type of drawing received.

If the initial contractor 5 receives a paper trihedral figure drawing 601, the next step is step S503. If an electronic drawing 603 is received, the next step is step S505 and if the initial contractor 5 receives a 3-D model, the next step is step S507.

In step S503, the drawing received is a paper trihedral figure drawing 601 so CAD drawings are produced with reference to this paper trihedral figure drawing 601.

In step S505, a solid figure drawing that is a three-dimensional solid figure form is produced from a two-dimensional CAD drawing.

The method for producing a three-dimensional, solid figure drawing 617 from a two-dimensional CAD graphic form 607 will now be described in outline with reference to FIG. 6.

Elements that are unnecessary for the creation of a solid figure drawing such as dimension lines, auxiliary lines, framing, reference figures and sheet thickness lines and the like are removed from the electronic trihedral FIG. 607. This results in display of a screen 609 comprising a front view 611, a side view 613 and a top view 615. The front view 611, side view 613 and top view 615 are correlated with each other in view of the bending positions. The solid figure drawing 617 is produced by adding data for sheet thickness and like to the connected views and is then displayed.

In step S507, the positions for disassembly of the product are indicated on the solid figure drawing, and a breakdown of the assembled components figure, the work of dividing the product up into a plurality of component parts, is performed. The breakdown of the assembled components figure is performed in accordance with instructions from the members participating in the processing edition conference, i.e. the president, factory manager and an experienced sheet metal bending engineer.

Figure 7:
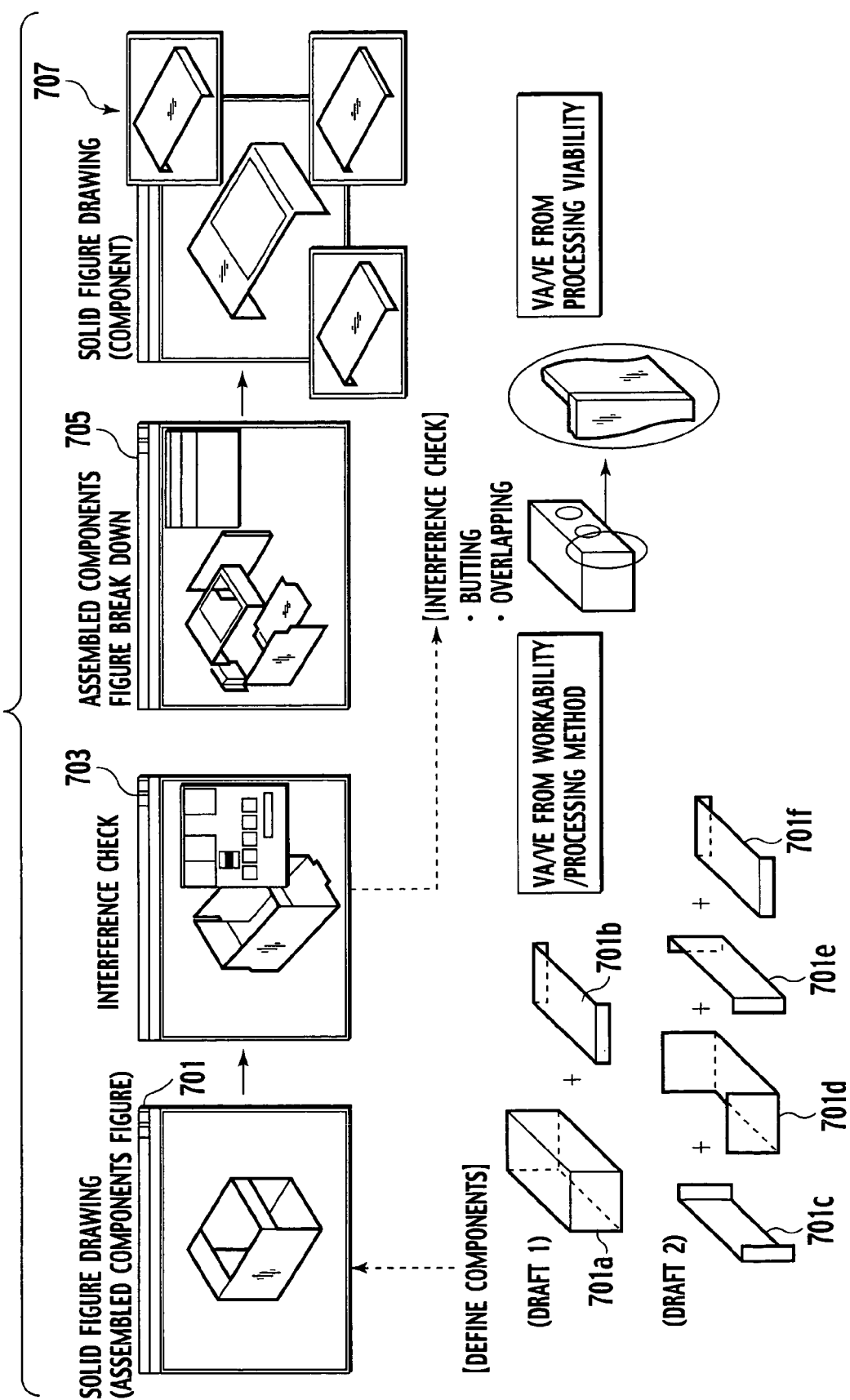
FIG. 7 is an explanatory drawing of a method for disassembling component parts of a solid figure drawing.

The break down of the assembled components figure, the work of dividing the product into a plurality of component parts, will now be described with reference to FIG. 7.

The solid figure drawing created in step S505 is displayed on a screen 701. On this screen, referring to the solid figure drawing, the appearance is investigated as well as interference and workability when the product is broken down into a plurality of the component parts thereof. Things investigated include for example dividing the product into a component part 701a and a component part 701b when considering costs of assembling the product, or when considering the method of processing the product, breaking the product down into a component part 701c, a component part 701d, a component part 701e and a component part 701f.

The results for VE (value engineering) and VA (value analysis) according to the workability and processing method as investigated here are stored in the database 50 as text data.

Further, on screen 703 a check is performed to ascertain any interference between component parts that may arise when a breakdown of the assembled components figure is performed. The VE and VA results for processing viability as investigated here are stored in the database 50 as text data.

Moreover, confirmation of how the product is to be divided into its component parts is performed at screen 705. A solid figure for each of the divided component parts is displayed on the screen 707. In this way, a development drawing can be created for each component part.

In step S509, a development drawing is created for each of the plurality of component parts into which the product is divided.

Figure 8:
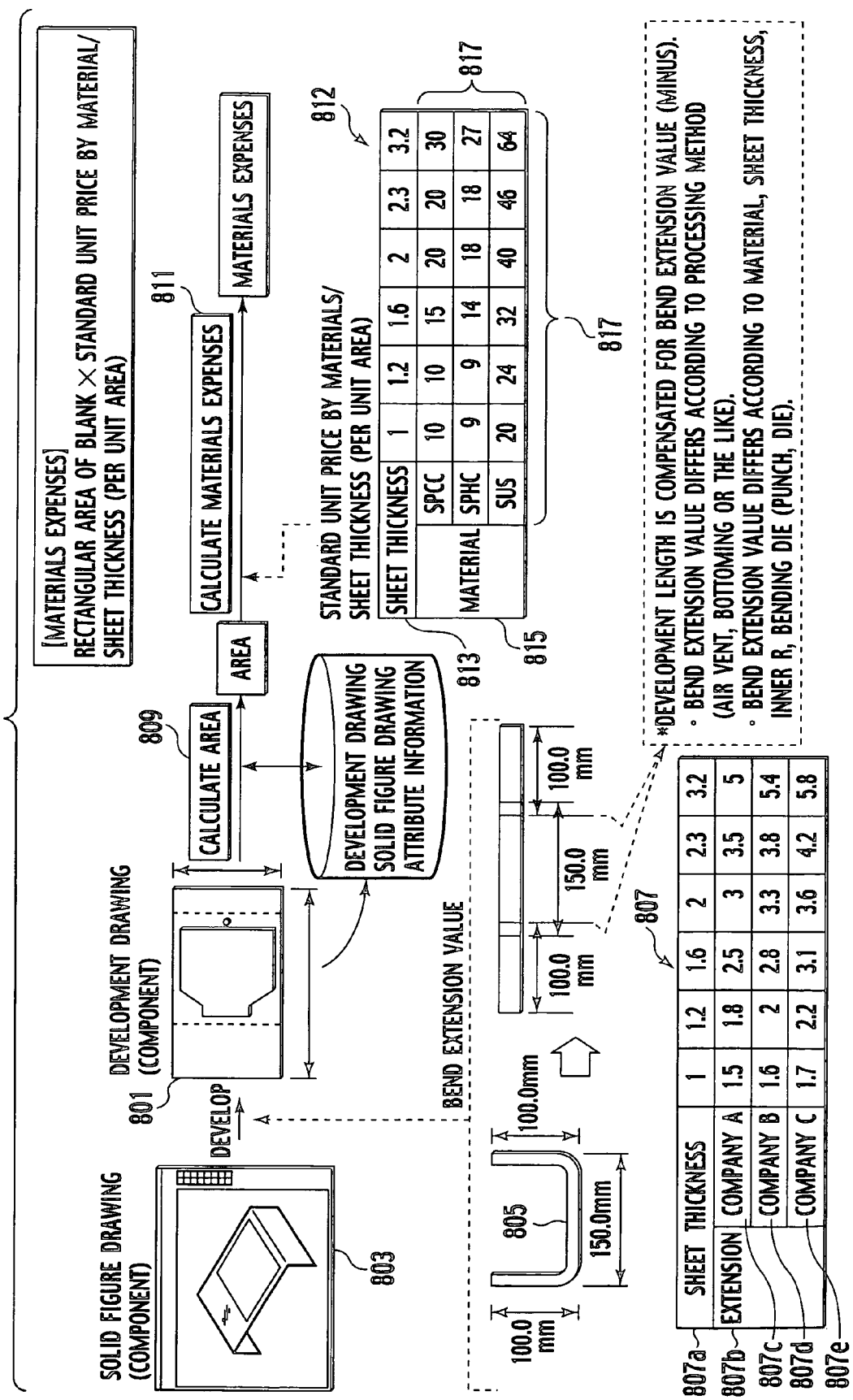
FIG. 8 is an explanatory drawing on calculation of materials expenses.

The method of creating a development drawing 801 will now be described with reference to FIG. 8. A solid figure drawing of a separated component part is displayed on a screen 803. Next, a development drawing 101 is created from the solid figure drawing of this component part. Here, an envisaged value of the extension from bending is considered when a bending portion is developed. For example, a table 807 stored in the process related reference table 45 is referenced when bending portion 805 is developed. This table 807 includes a sheet thickness column 807a and a bend extension value column 807b. The bend (bending) extension values for each company are set in the bend extension column 807b

(company A 807*c*, company B 807*d* and company C 807*e*). That is to say, where the ordering party 3 is company A 807*c*, when the product uses material of sheet thickness 1, the bend extension is set at 1.5 if a bend is required. Accordingly, development drawing 801 is produced having dimensions in which the value for the fold extension is compensated for (subtracted).

The area calculation 809 is performed from the development drawing 801. Table 812 stored in the process related reference table 45 is then referred to perform materials expenses calculation 811. In this table 812, unit prices for a plurality of materials 815 (e.g. SPCC, SPHC, SUS) corresponding to each sheet thickness 813 are registered in the price columns/rows 817. Accordingly, materials expenses are calculated from the raw materials (the material and sheet thickness) and the value for area. The materials expenses data is stored in memory.

Further, the expense required for processing a blank are calculated by reference to the development drawing. That is to say, the blank processing expenses are calculated from the raw materials (materials and sheet thickness) and the form developed.

The method for calculating the expenses for processing a bank (blank processing expenses) will now be described with reference to FIG. 9. The data for the development drawing 901 is read in from a CAD/CAM data file 43 in which the development drawing 901 is stored. The blank processing can be performed by processing with a turret punch press or a laser processor.

Calculating Processing Expenses for Processing a Blank Using a Turret Punch Press The processing expenses where processing is performed using a turret punch press is the value obtained by multiplying the blank processing expense 903 for processing the form developed by the number of sheets for processing 905, then adding turret punch press setup expenses 907. The blank processing expenses 903 represent the sum total of shearing process expenses 903*a*, turret punch press processing expenses 903*b*, tapping processing expenses 903*c* and deburring processing expenses 903*d*.

Figure 9:
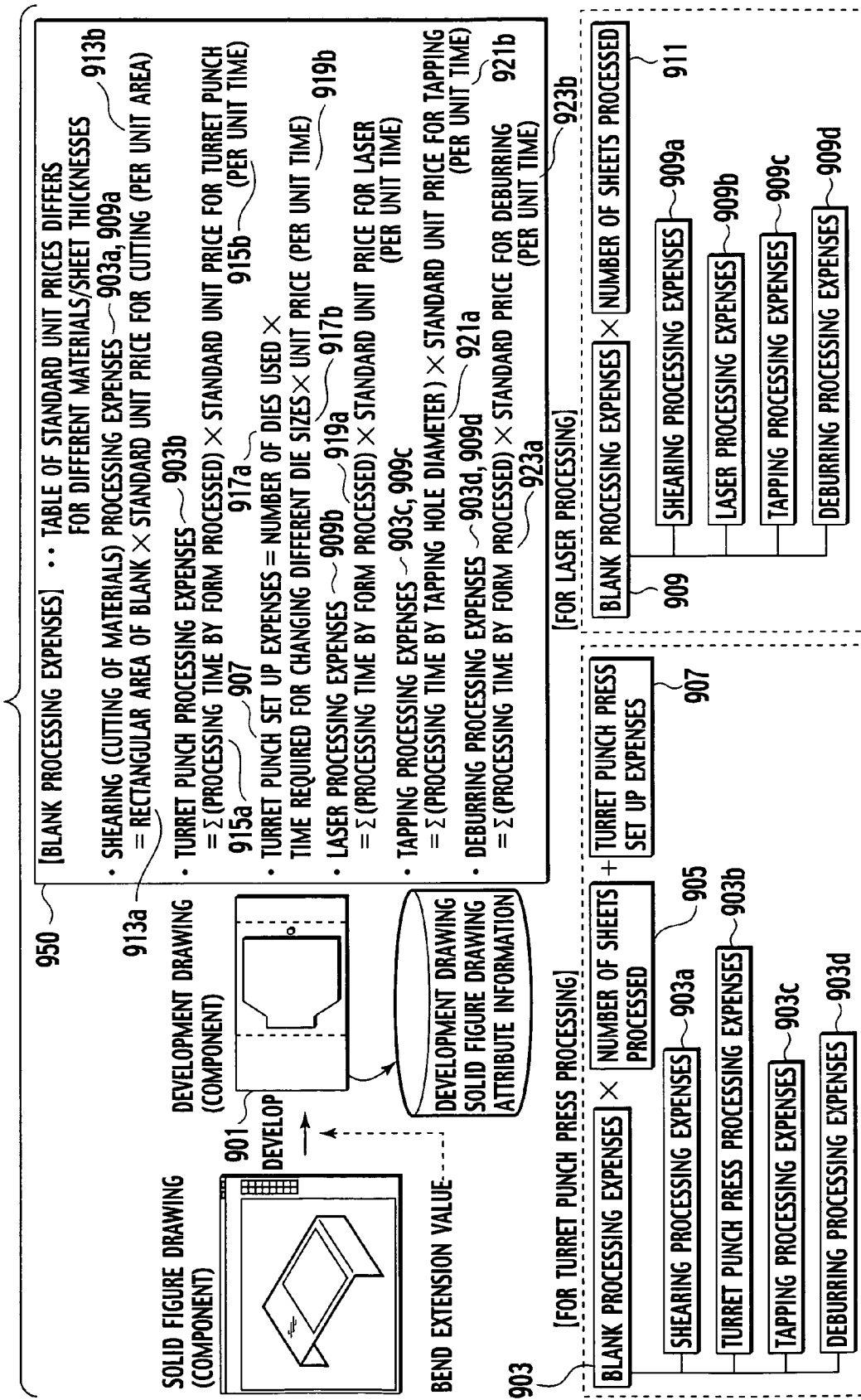
FIG. 9 is an explanatory drawing on calculation of expenses for blank processing work.

As shown in the field 950 in FIG. 9, when shearing processing expenses 903*a* are required, the rectangular area of the blank material 913*a* is multiplied by a standard unit price for cutting 913*b* (area units).

Figure 10:
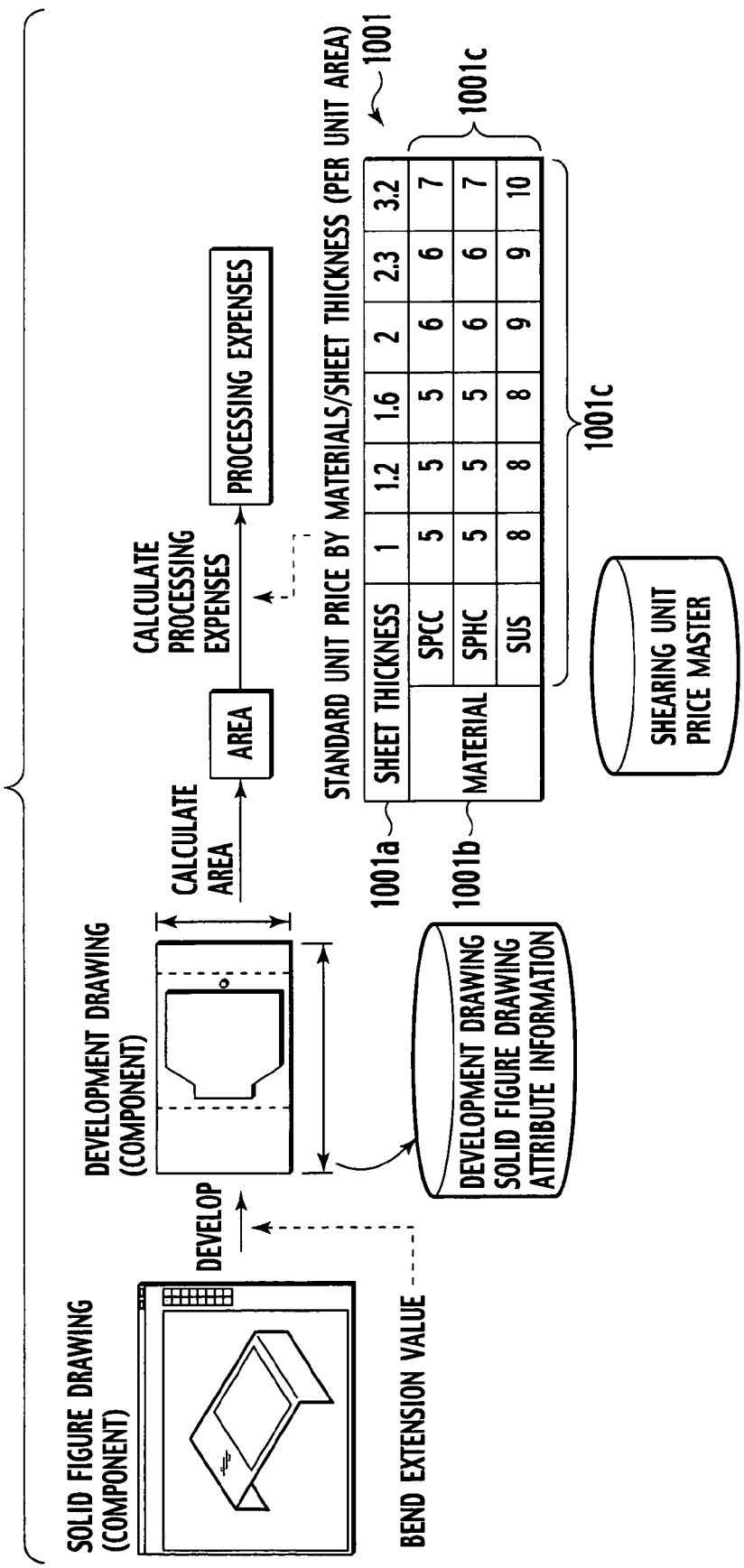
FIG. 10 is an explanatory drawing on preparation of an estimate for the cost of shearing processes.

The method of calculating shearing process expenses 903*a* will now be described with reference to FIG. 10. The area is calculated based on the development drawing data read in. Then, the shearing unit price master table 1001 stored in the process related reference table 45 is referred to. In table 1001, materials columns/rows 1001*b* (e.g. SPCC, SPHC, SUS) are arranged corresponding to a plurality of sheet thickness columns 1001*a*. Unit price columns/rows 1001*c* are arranged to correspond to the materials of different sheet thicknesses, with a unit price arranged for each unit area. Accordingly, shearing process expenses 903*a* are calculated from the raw material (the material and sheet thickness) and the area.

As shown in the field 950 of FIG. 9, when turret punch process expenses 903*b* are required, the value is calculated by multiplying the processing time by form processed 915*a* (calculated from NC data) by a standard unit price for turret punch press work 915*b* (time units). These calculations are performed for all processed forms and the total, that is for the total of all the forms developed for parts arranged on one sheet, is then calculated.

When turret punch press setup expenses 907 are required, the number of dies to be used 917*a* is multiplied by the time required for changing different die sizes 917*b* to calculate the time required for changing dies. The time required for changing dies is multiplied by a unit price (time units).

Figure 11:
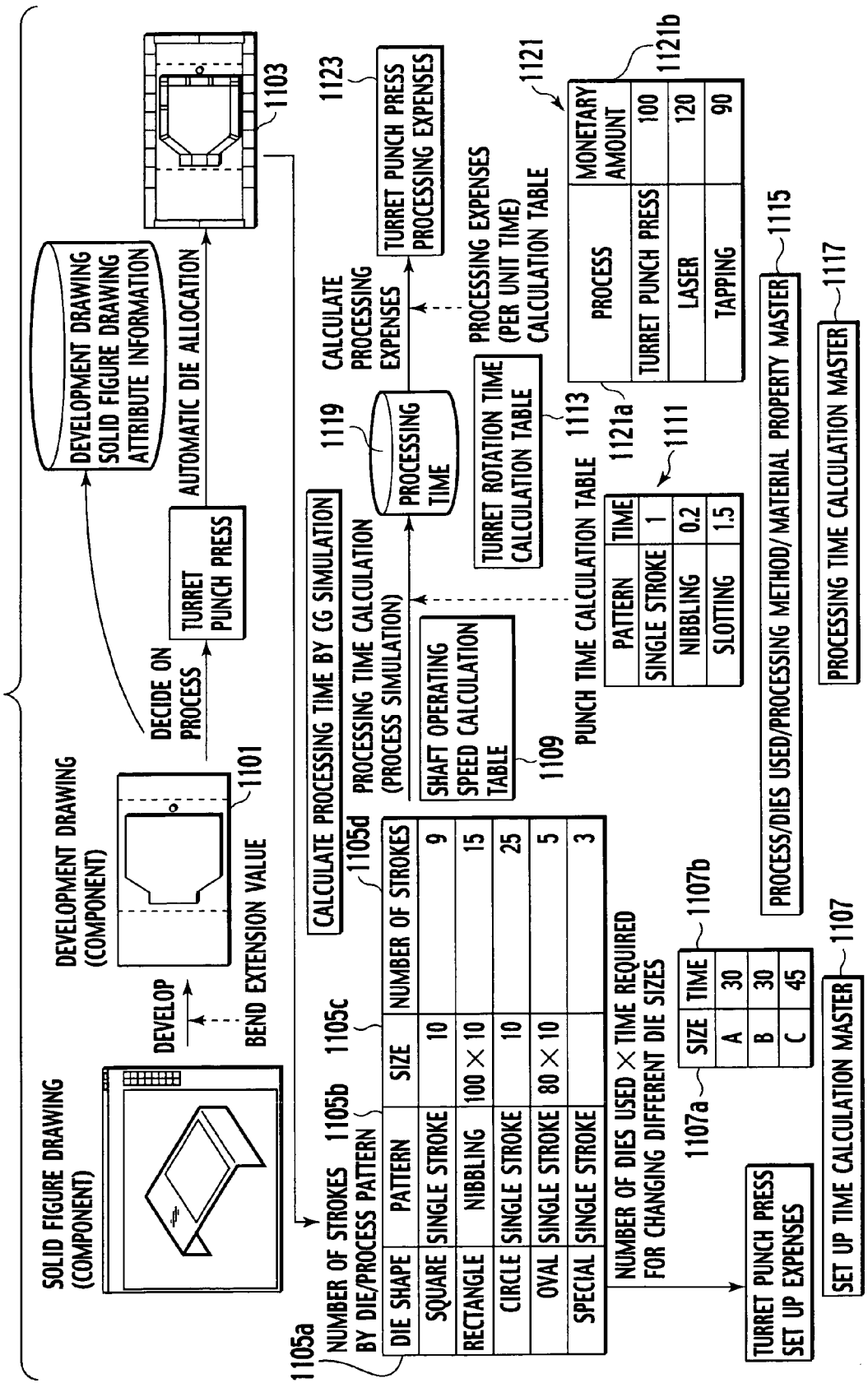
FIG. 11 is an explanatory drawing on calculation of expenses for turret punch press processing work.

Estimation for turret punch process expenses 903*b* and setup expenses 907 will now be described in detail with reference to FIG. 11. The steps for making an estimate for turret punch process expenses 903*b* and setup expenses 907 include a step of deciding on the turret punch press process in relation to the development drawing and allocating the dies, a step of ascertaining the time required to set up the dies and the expenses for that setting up, a step of working out an accurate processing time by doing a processing simulation and a step of calculating the turret punch process expenses based on the processing time.

More specifically, development drawing 1101 is read in and s determination is made that turret punch presses will be performed. Die process data 1103 is allocated to the development drawing 1101. Based on the die process data 1103, the number of punches 1105*d* is calculated from the die shape 1105*a*, pattern 1105*b* and the die size 1105*c*. The die size 1107*a* and the corresponding time required for changing dies are read in from the setup time calculation master 1107 stored in the process related reference table 45. The total setup time for the dies to be used is ascertained based on this. This total time is multiplied by a unit price to calculate turret punch press setup expenses 907.

Next, the operating speed calculation table 1109, the punch time calculation table 1111, the turret turnaround time calculation table 1113, the processor/dies used/processing method/material property master 1115 and the processing time calculation master 1117 stored in the process related reference table 45 are referred to and a CG simulation performed to calculate the processing time 1119.

The processing expenses calculation table 1121 is referenced and turret punch press processing expenses 1123 (903*b*) are calculated from the processing time 1119. The processing expenses calculation table 1121 includes a processing type column 1121*a*, (e.g. turret punch press processing, laser processing or tapping processing) and a monetary amount column 1121*b*, having amounts set corresponding to the processing type.

As shown in the field 950 of FIG. 9, when tapping processing expenses 903*c* are required, the value is calculated by multiplying the processing time for different tapping hole diameters 921*a* by a standard unit price for tapping 921*b* (time units). This calculation is performed in accordance with the number of tapping holes to calculate the sum total.

Figure 13:
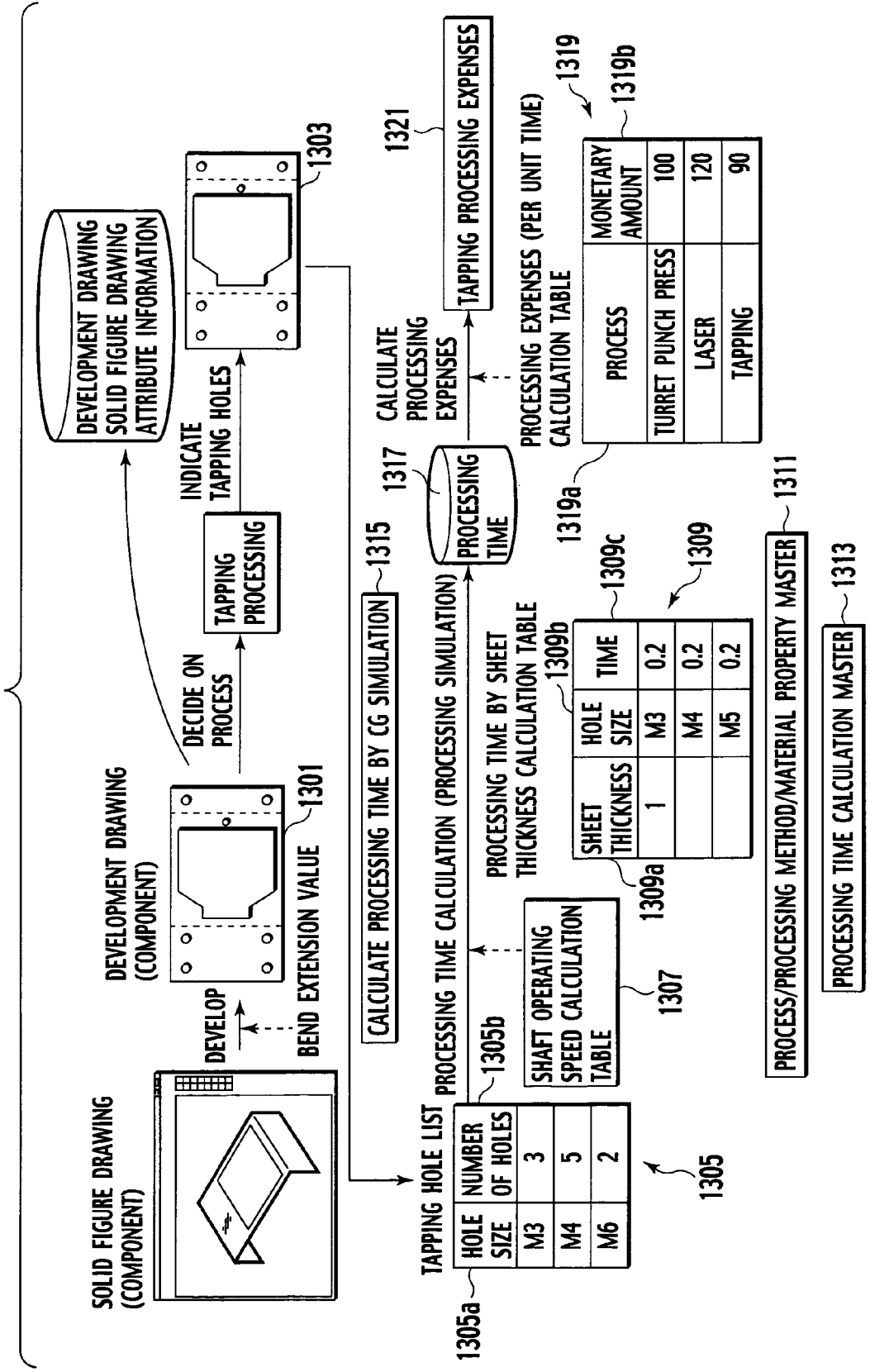
FIG. 13 is an explanatory drawing on calculation of expenses for tapping processing work.

Estimation for tapping processing expenses 903*c* will now be described in detail with reference to FIG. 13. The steps for making an estimate for tapping processing expenses 903*c* include a step of deciding on the tapping process, a step of calculating processing time required based on the tapping bore diameter and the number of holes, and a step of calculating tapping processing expenses 903*c* based on this processing time.

More specifically, firstly development drawing 1301 is read in and a determination is made that tapping processes are required. Tapping instruction drawing 1303 showing the locations at which the tapping process is to be performed is then produced. The diameter of the tapping 1305*a* (e.g. M3, M4, M6) and the number of corresponding holes 1305*b* is extracted from this tapping instruction drawing 1303. Then, the shaft operating speed calculation table 1307, the processing time by sheet thickness calculation table 1309, the processing machine/processing method/material property master 1311 and the processing time calculation master 1313 stored in the process related reference table 45 are referred to, and a processing time calculation 1315 is performed by doing a CG simulation, and processing time 1317 is calculated. The processing time by sheet thickness calculation table 1309 includes a sheet thickness column 1309a that establishes the thickness of a sheet, a hole diameter column 1309b that sets the hole diameter (e.g. M3, M4, M5) in relation to each sheet and a processing time column 1309c that sets the processing time in relation to each hole diameter.

The processing time 1317 is read in, the processing expenses (time units) calculation table 1319 is referred to and tapping processing expenses 1321 (903c) are calculated. The processing expenses (time units) calculation table 1319 includes a processing type column 1319a that sets the type of process to be performed (such as turret punch press, laser processing, tapping processing) and a monetary amount column 1319b that sets a unit price corresponding to the type of processing.

As shown in field 950 of FIG. 9, when deburring process expenses 903d are required, processing time by form processed 923a is multiplied by a standard unit price for deburring 923b (time units). This calculation is performed in respect of all forms processed and the sum total is calculated.

Figure 14:
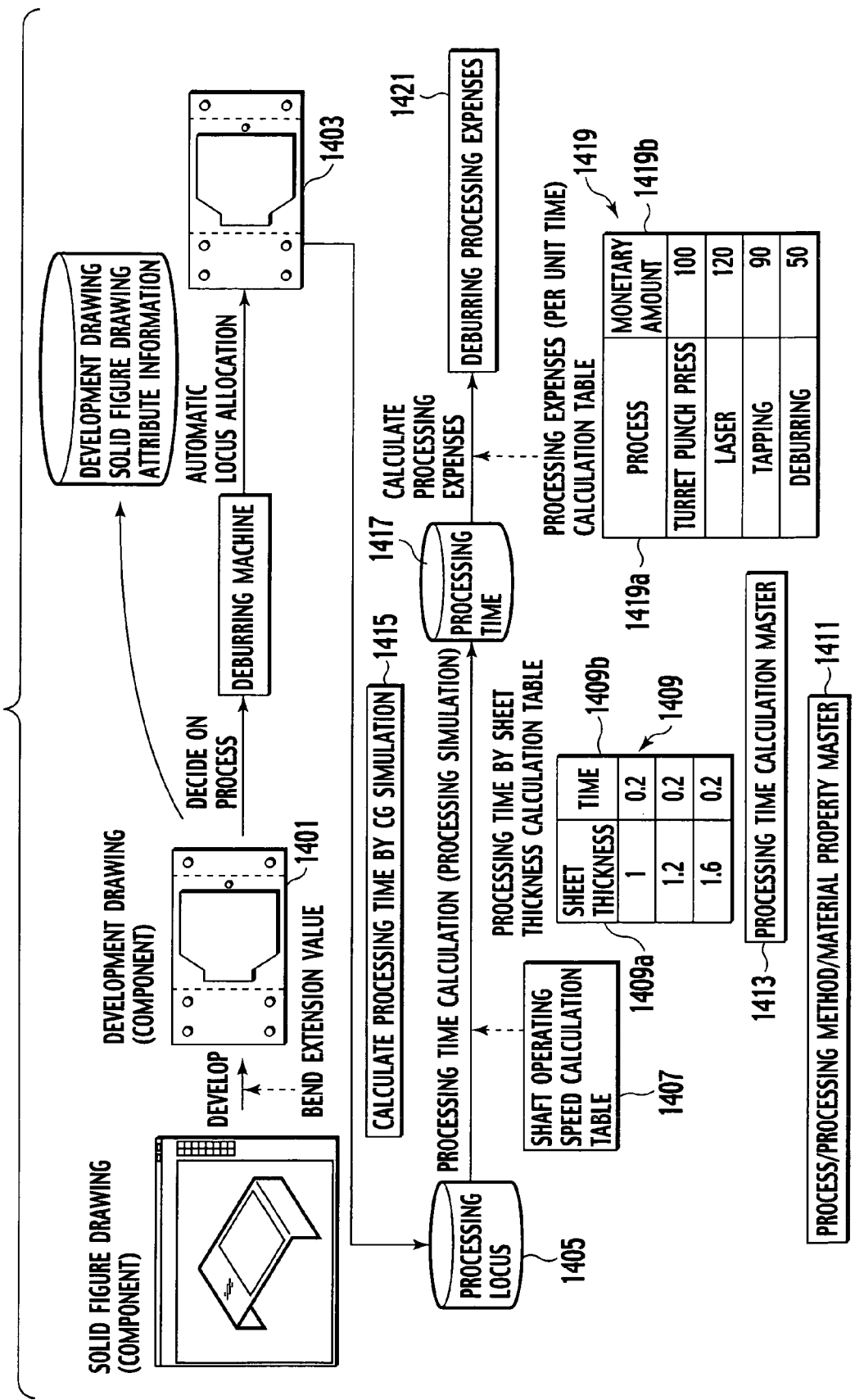
FIG. 14 is an explanatory drawing on calculation of expenses for deburring processing work.

Estimation for deburring process expenses 903d will now be described in detail with reference to FIG. 14. The steps for making an estimate for deburring process expenses 903d include a step of deciding on the deburring process in relation to the development drawing and allocating a deburring process locus(trajectory), a step of accurately calculating the processing time by doing a process simulation and a step of calculating the deburring process expenses based on the processing time.

More specifically, firstly, the development drawing 1401 is read in and a decision is made that deburring processes are required. Then a processing locus layout diagram 1403 is produced from the development drawing 1401. The processing locus 1405 is extracted from the processing locus layout diagram 1403. Then, the shaft operating speed calculation table 1407, the processing time by sheet thickness calculation table 1409, the processing machine/processing method/material property master 1411 and the processing time calculation master 1415 stored in the process related reference table 45 are referred to, before a processing time calculation 1415 is performed by doing a CG simulation and processing time 1417 is calculated. The processing time by sheet thickness calculation table 1409 includes a sheet thickness column 1409a that establishes the thickness of a sheet and a time column 1409b that sets the time used for processing in relation to the thickness.

A processing expenses (time units) calculation table 1419 is referenced and the deburring process expenses 1421 (903d) are calculated from the processing time 1417. The processing expenses (time units) calculation table 1419 includes a processing type column 1419a that sets the type of process to be performed (such as turret punch press, laser processing, tapping processing and deburring processing) and a monetary amount column 1419b that sets an amount corresponding to each type of processing.

Calculating Processing Expenses for Processing a Blank Using a Laser Processor

As shown in the bottom left field of FIG. 9, the processing expenses where processing is performed using a laser processor is the value obtained by multiplying the blank processing expenses 909 for processing the form developed by the number of sheets for processing 911. The blank processing expenses 909 represent the sum total of shearing process expenses 909a, laser processing expenses 909b, tapping processing expenses 909c and deburring processing expenses 909d.

As shown in the field 950 in FIG. 9, when shearing process expenses 909a are required, the rectangular area of the blank material 913a is multiplied by a standard unit price for cutting 913b (unit area). The steps for calculating shearing process expenses 909a are the same as those for calculating shearing process expenses 903a for processing a blank using a turret punch press.

As shown in the field 950 in FIG. 9, when laser processing expenses 909b are required, the value is calculated by multiplying the processing time for different forms processed 919a by a standard unit price for laser processing work 919b (time units). These calculations are performed for all processed forms and the total is then calculated.

Figure 12:
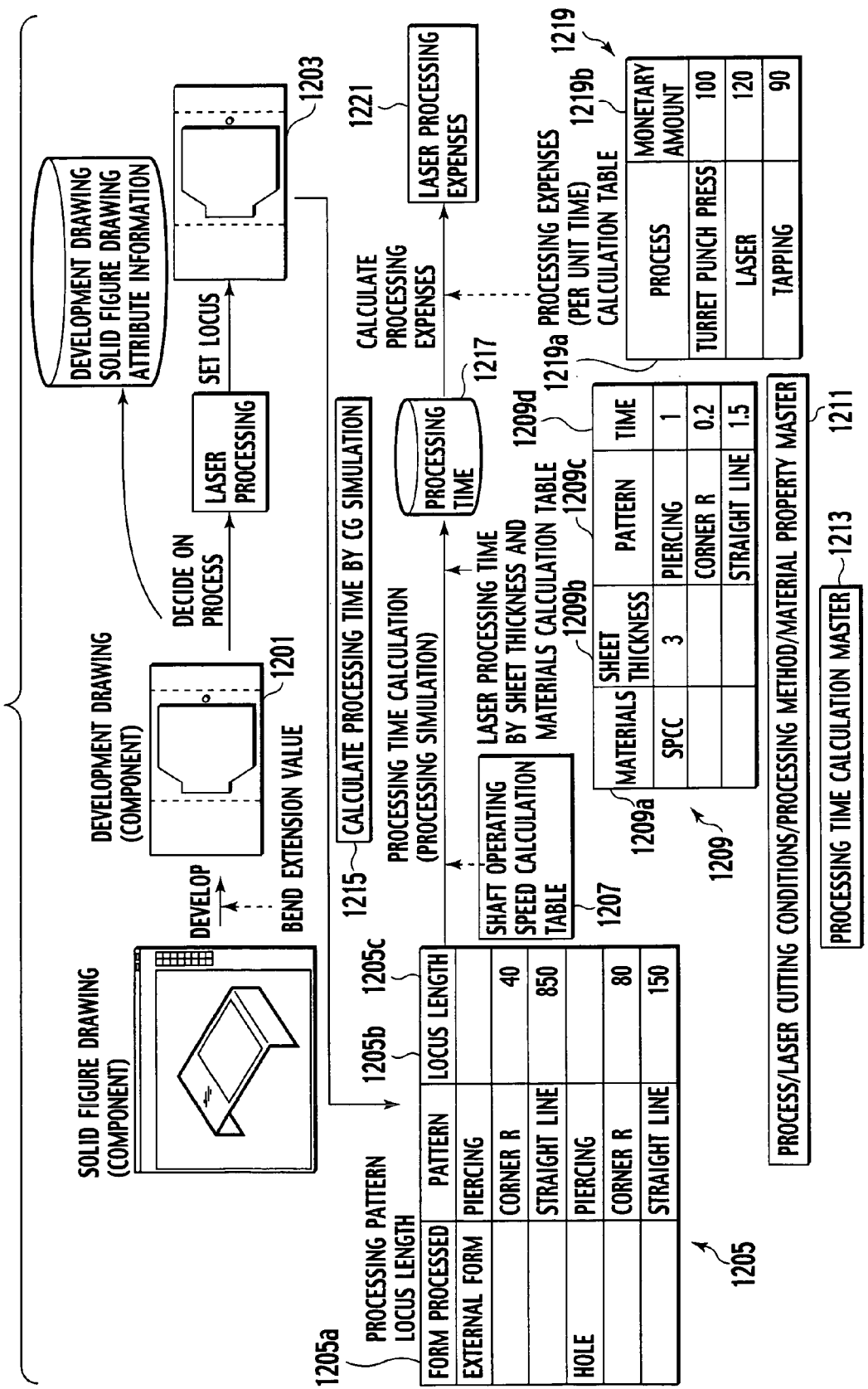
FIG. 12 is an explanatory drawing on calculation of expenses for laser processing work.

Estimation for laser processing expenses 909b will now be described in detail with reference to FIG. 12. The steps for making an estimate for laser processing expenses 909b include a step of deciding on the laser process in relation to a development drawing and allocating a laser processing locus, a step of accurately calculating the processing time by doing a process simulation and a step of calculating the laser processing expenses 909b based on the processing time.

More specifically, firstly the development drawing 1201 is read in and a decision made that the processing method will be laser processing. A process locus(trajectory) 1203 is then produced. The form processed 1205a (e.g. the external form, holes), pattern 1205b (e.g. a piercing, corner R or straight line) and locus length 1205c are extracted from the processing locus 1203 while being correlated with each other. Then, the shaft operating speed calculation table 1207, the laser processing time by sheet thickness and materials calculation table 1209, the processing machine/laser cutting conditions/processing method/material property master 1211 and the processing time calculation master 1215 stored in the process related reference table 45 are referred to and a processing time calculation 1215 is preformed by doing a CG simulation. The laser processing time by sheet thickness and materials calculation table 1209 includes a materials column 1209a that sets the materials, a sheet thickness column 1209b that sets the thickness of a sheet, a pattern column 1209c that sets the pattern and a time column 1209d that sets the time used for processing. Thus, a processing time unit can be specified for each material, sheet sickness or pattern (e.g. piercing, corner R or straight line).

After processing time 1217 is obtained, the processing expenses (time units) calculation table 1219 stored in the process related reference table 45 is referenced and the laser processing expenses 1221 (909b) are calculated. The processing expenses (time units) calculation table 1219 includes a processing type column 1219a that sets the type of process to be performed (such as turret punch press, laser processing, tapping processing) and a column 1219b that sets a unit price corresponding to each of these types of processing. Thus, the unit price for each process can be obtained.

As shown in the field 950 of FIG. 9, when tapping processing expenses 909c are required, the value is calculated by multiplying the processing time for different tapping hole diameters 921a by a standard unit price for tapping 921b (time units). This calculation is performed in accordance with the number of tapping holes to calculate the total. The steps for calculating tapping processing expenses 909c are the same as those for calculating tapping processing expenses 903c for processing a blank using a turret punch press.

When deburring process expenses 909d are required, processing time by form processed 923a is multiplied by a standard unit price for deburring 923b (time units). This calculation is performed in respect of all forms processed and the sum total is calculated. The steps for calculating deburring process expenses 909*d* are the same as those for calculating deburring process expenses 903*d* for processing a blank using a turret punch press.

Referring again to FIG. 5, verification of a prototype/model is performed in step S511. This prototype verification will now be described in detail with reference to FIG. 15. The prototype verification involves performing prototype verification 1503 to verify such things as what dies should be used for the parts of development drawing 1501, what kind of processes should be used for the bending operations, and the like. The results are stored as text data in the database 50 as VA/VE results from processing viability 1503*a* and VA/VE results from workability and processing method 1503*b*.

In step S512, bending process expenses are calculated based on the results ascertained in step S511. The bending process expenses are calculated by multiplying the bending process expenses 1505 for each development drawing by the number of sheets processed 1507 and then adding bending set up expenses 1509, and where purchase of a special die is required, expenses for purchase of a special die 1511.

More specifically, to obtain the bending process expenses 1505 in relation to a development drawing, the processing time by bend form (bending shape) 1513*a* is multiplied by a standard unit price for bending (time units) 1513*b*. This calculation is performed in respect of all bending portions included in the development drawing to calculate the sum total. Bending set up expenses 1509 represent the value obtained by multiplying the number of dies to be used 1515*a* by the time required for changing dies (unit price) 1515*b*.

The steps for making an estimate for bending process expenses include a step of deciding on bend lines and bending sequence in relation thereto as well as dies to be used, a step of calculating the processing time by performing a bending process simulation by verification with a prototype, and a step of calculating the bending process expenses based on the processing time.

Figure 16:
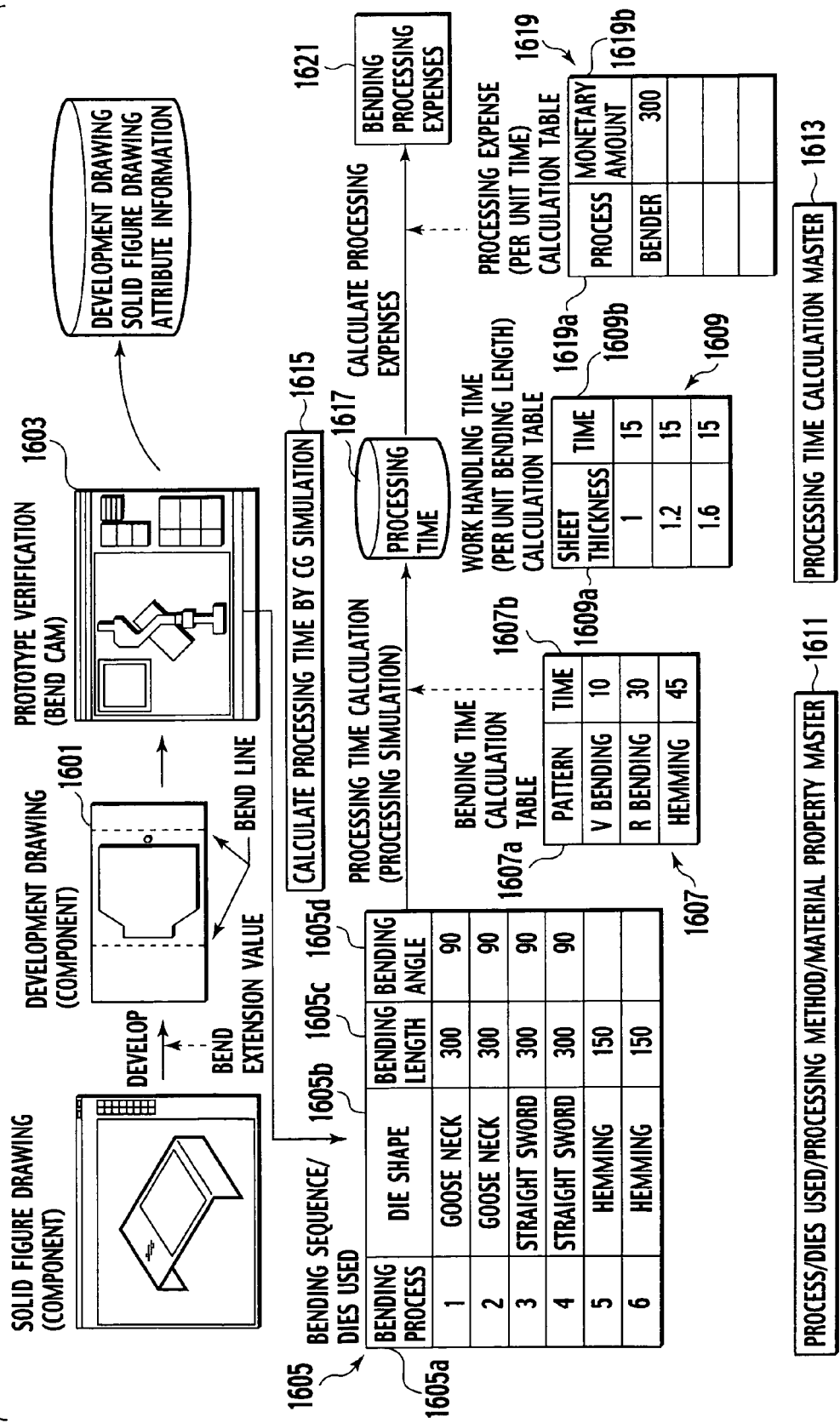
FIG. 16 is an explanatory drawing on calculation of expenses for bending processing work.

The method for calculating bending process expenses in relation to a development drawing will now be described in detail with reference to FIG. 16.

Development drawing 1601 is read in and prototype verification 1603 is then performed. Bending process 1605*a*, die shape 1605*b*, bending length 1605*c* and bending angle 1605*d* are read in from the development drawing verified by verification with a prototype. Then, the bending time calculation table 1607, work handling time (bending length units) calculation table 1609, processing machine/dies to be used/processing method/material property master 1611 and processing time calculation master 1613 stored in the process related reference table 45 are referred to and processing time calculation 1615 is performed by doing a CG simulation. This results in calculation of processing time 1617.

The bending time calculation table 1607 includes a pattern column 1607*a* that sets the pattern and a time column 1607*b* that sets the processing time for each fold pattern. The work handling time (bending length units) calculation table 1609 includes a sheet thickness column 1609*a* for setting the sheet thickness and a time column 1609*b* for setting the processing time for each sheet thickness.

The processing time 1617 is read in, the processing expenses (time units) table 1619 stored in the process related reference table 45 is referred to and bending processing expenses 1621 (1505) are calculated. The processing expenses (time units) table 1619 includes a processing column 1619*a* for setting the processing method (e.g. bender) and a monetary amount column 1619*b* for setting the required monetary amount.

Figure 17:
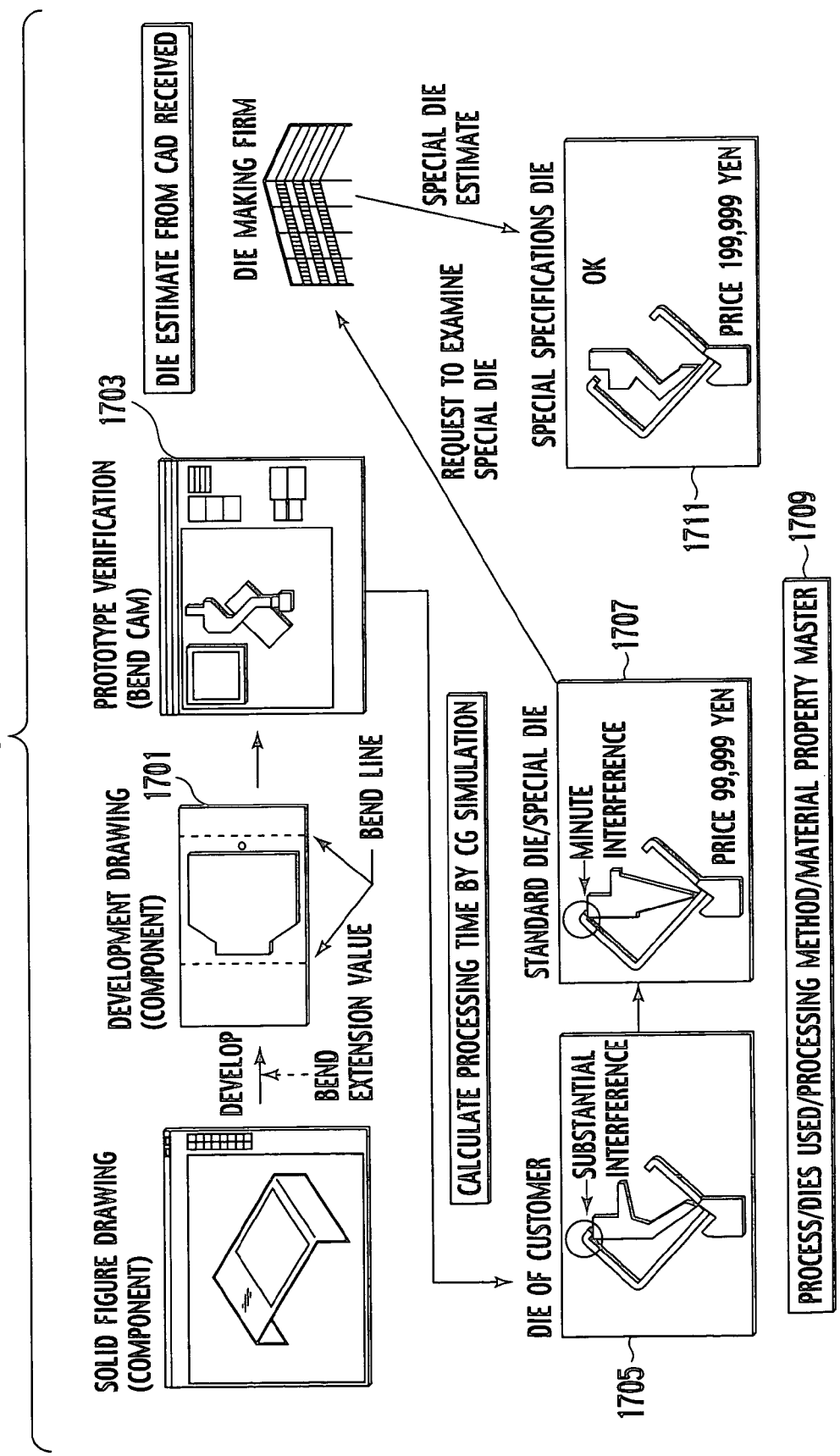
FIG. 17 is an explanatory drawing on calculation of expenses for bending processing work.

The steps for calculating expenses for a special die will now be described in detail with reference to FIG. 17. The steps for making an estimate for the purchase of a special die include a step of performing a simulation of the required processes for the product by verification with a prototype and performing a check to determine if there is interference, and a step of adding expenses for the purchase of a special die if there is interference.

More specifically, development drawing 1701 is read in and verification with a prototype 1703 is performed. The result is a situation 1705 in which it is determined that there is substantial interference using the die which the initial contractor 5 holds. In this situation, a special form is decided on and an order for a die estimate 1709 is issued to a die making firm. The production expenses estimate for the die of special specifications 1711 presented here, forms the special die expenses.

Referring again to FIG. 5, the processes of the step S509 and S511 described above are performed in respect of all component parts into which the product is divided.

In step S513, verification from an assembled components drawing is performed, this verification enabling welding expenses, coating expenses and expenses for assembling component parts to be calculated. That is to say, the respective expenses required for welding work, coating work and components assembly work are calculated by performing simulations.

Figure 18:
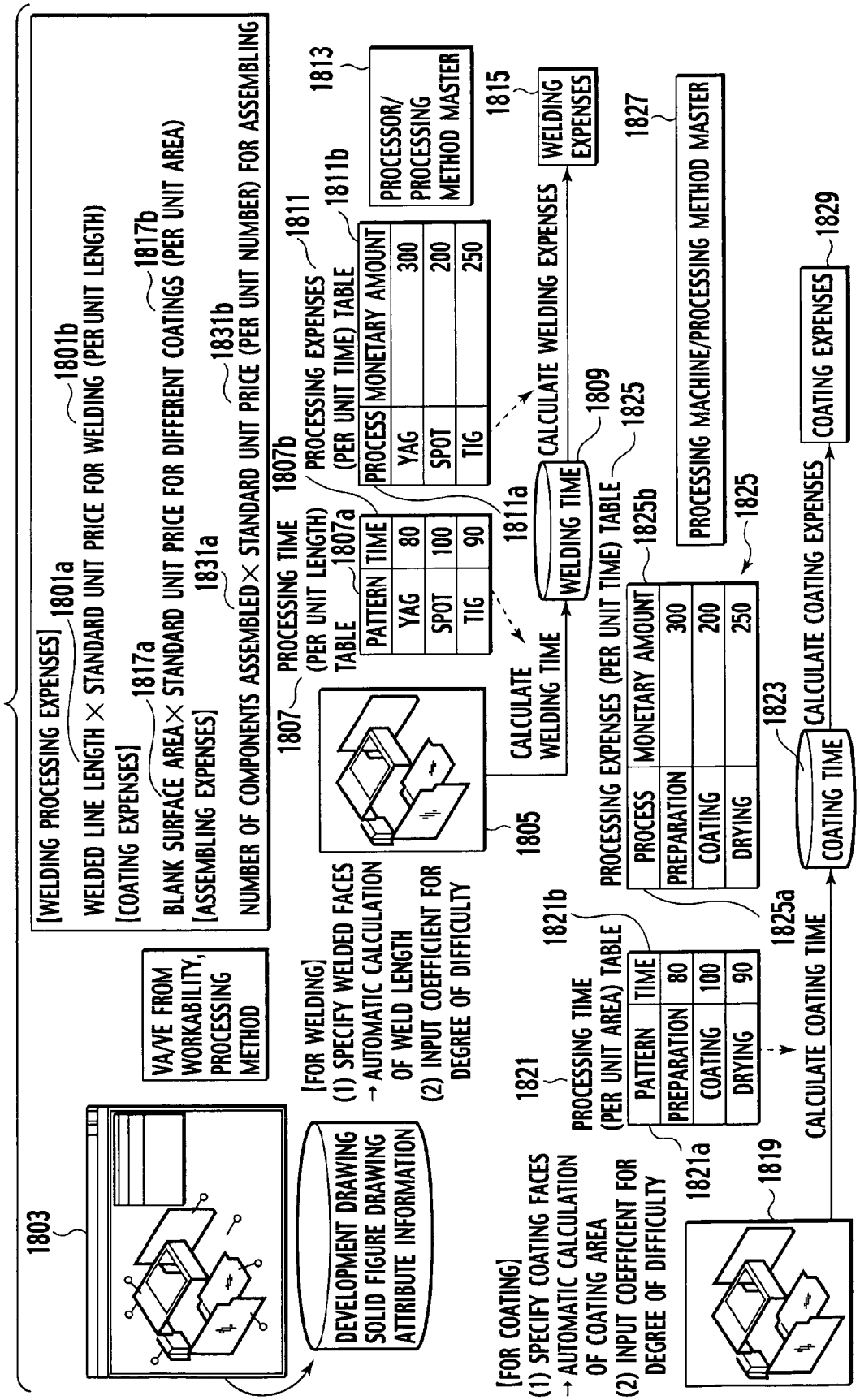
FIG. 18 is an explanatory drawing on calculation of expenses for welding, coating and assembly work.

The method for calculating welding expenses, coating expenses and components assembly expenses will now be described with reference to FIG. 18.

The welding process expenses are calculated by multiplying the welding line length 1801*a* by a standard unit price for welding 1801*b* (units of length). That is to say, the solid figure drawing 1803 of the product broken down into a plurality of component parts is read in, welding faces are specified and calculation 1805 is performed to determine the length of welding required. Here, a coefficient representing the degree of difficulty is added to each weld location. Then, the process time (units of length) table 1807 is referred to and the welding time 1809 is calculated. The process time (units of length) table 1807 includes a pattern column 1807*a* that sets the type of welding (e.g. YAG, spot, TIG) and a time column 1807*b* that sets the time required for welding according to the unit length of each pattern.

Then the welding time 1809 is read in, the process expenses (time units) table 1811 and processing machine/processing method master 1813 are referred to and welding expenses 1815 are calculated. The process expenses table 1811 includes a process column 1811*a* that sets the type of welding (e.g. YAG, spot, TIG) and a monetary amount column 1811*b* that sets the monetary amount required for welding according to the time unit concerned.

Coating expenses are calculated by multiplying the blank surface area 1817*a* by a standard unit price (area units) for different coatings.

That is to say, a solid figure drawing of the product broken down into a plurality of component parts is read in and instructions 1819 is made on coating faces with the solid figure drawing. The processing time (area units) table 1821 is referred to and the coating time 1823 is calculated. The processing time (area units) table 1821 includes a pattern column 1821*a* that sets the pattern of the process performed (e.g. preparation, coating, drying) and a time column 1821*b* that sets the time for each unit of area required to undergo the process of each pattern.

The coating time 1823 is read in, the processing expenses (time units) table 1825 and processing machine/processing method master 1827 are referred to and coating expenses 1829 are calculated. The processing expenses (time units) table 1825 includes a process column 1825*a* that sets the type of process (e.g. preparation, coating, drying) and a monetary amount column 1825*b* that sets a monetary amount for each unit of time required for each process.

Assembling expenses are obtained by multiplying the number of component parts assembled 1831*a* by a standard unit price (number of units) for assembling 1831*b*.

Referring again to FIG. 5, if there are any problematic issues during verification from an assembled components drawing, operations revert back to step S507 and a review(re-evaluation) of breakdown of the assembled components figure is performed.

In step S515, a production schedule is evaluated and an estimated delivery schedule is worked out.

Figure 19:
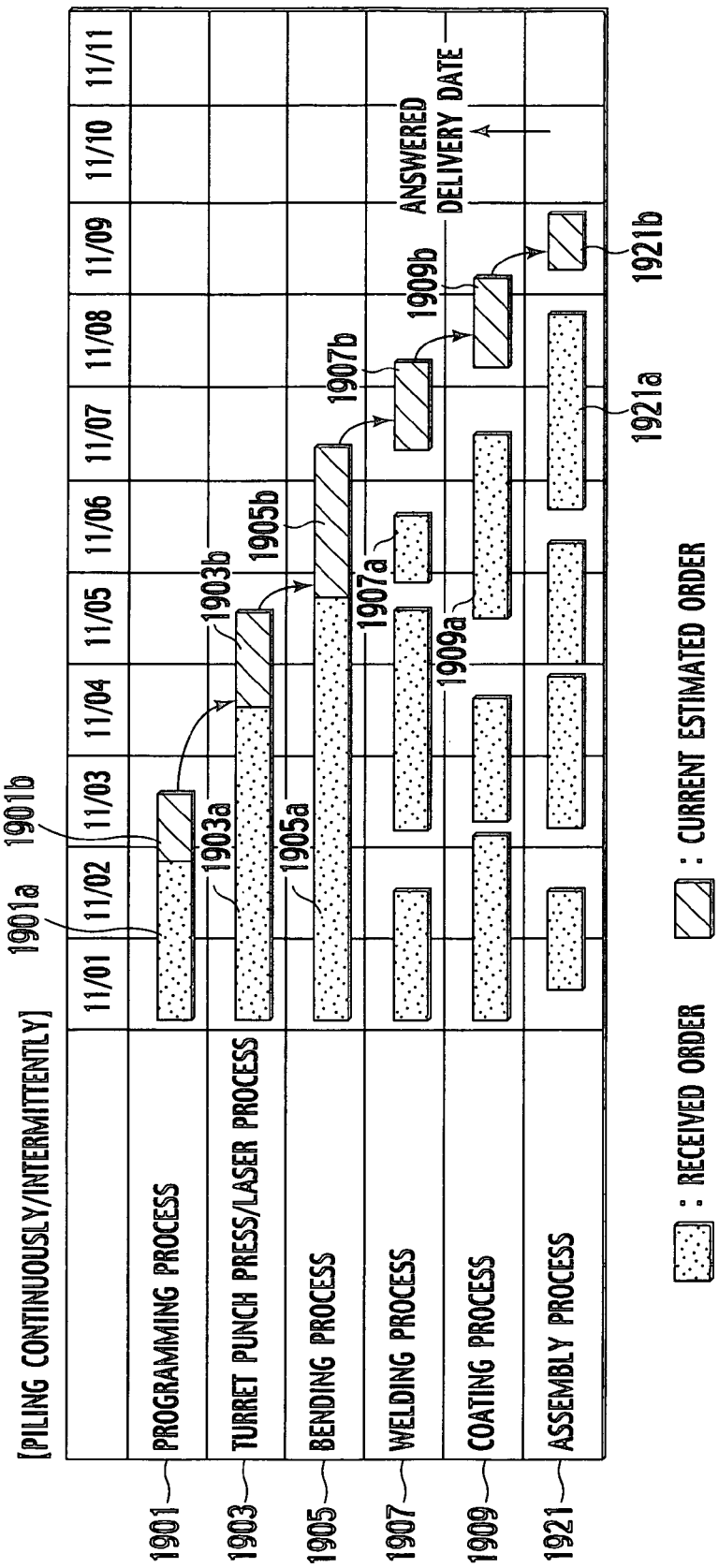
FIG. 19 is an explanatory drawing on calculating a delivery schedule.

FIG. 19 shows the method for deciding the delivery schedule. The method for deciding the delivery schedule includes a step of calling up the production schedule for orders already accepted, a step of continuously or intermittently piling up a time required for performing each process for present estimated orders on the former schedule, and a step of deciding on the delivery date based on the final processing delivery schedule.

In the example shown in FIG. 19, the processing steps for producing the product include a programming process 1901, turret punch press/laser process 1903, a bending process 1905, a welding process 1907, a coating process 1909 and an assembling process 1911. In the programming process 1901, process for the current orders now at the estimate stage 1901b will be incorporated after process for the received order 1901a.

In the turret punch press/laser process 1903, process for the current estimated orders 1903b is incorporated after process for the received order 1903a. In the bending process 1905, process for the current estimated orders 1905b is incorporated after process for the received order 1905a.

In the welding process 1907, process for the current estimated orders 1907b is incorporated after process for the received order 1907a. In the coating process 1909, process for the current estimated orders 1909b is incorporated after process for the received order 1909a. In the assembling process 1911, process for the current estimated orders 1911b is incorporated after process for the received order 1911a. Delivery dates are decided by these steps.

The estimates are presented to the ordering customer 3.

In step S517, using collaboration tools, the ordering customer 3 and the initial contractor 5 are able to share the solid figure drawings that have been designed by the initial contractor 5 to investigate the proposal of VA/VE and content of the design.

A processing program (NC data) is created at the same time as the estimates described above are worked out. Accordingly, a processing program is produced by the time that the estimates are calculated. Thus, the processing work can begin immediately upon receipt of instructions from the ordering customer 3 to produce the product.

Figure 20:
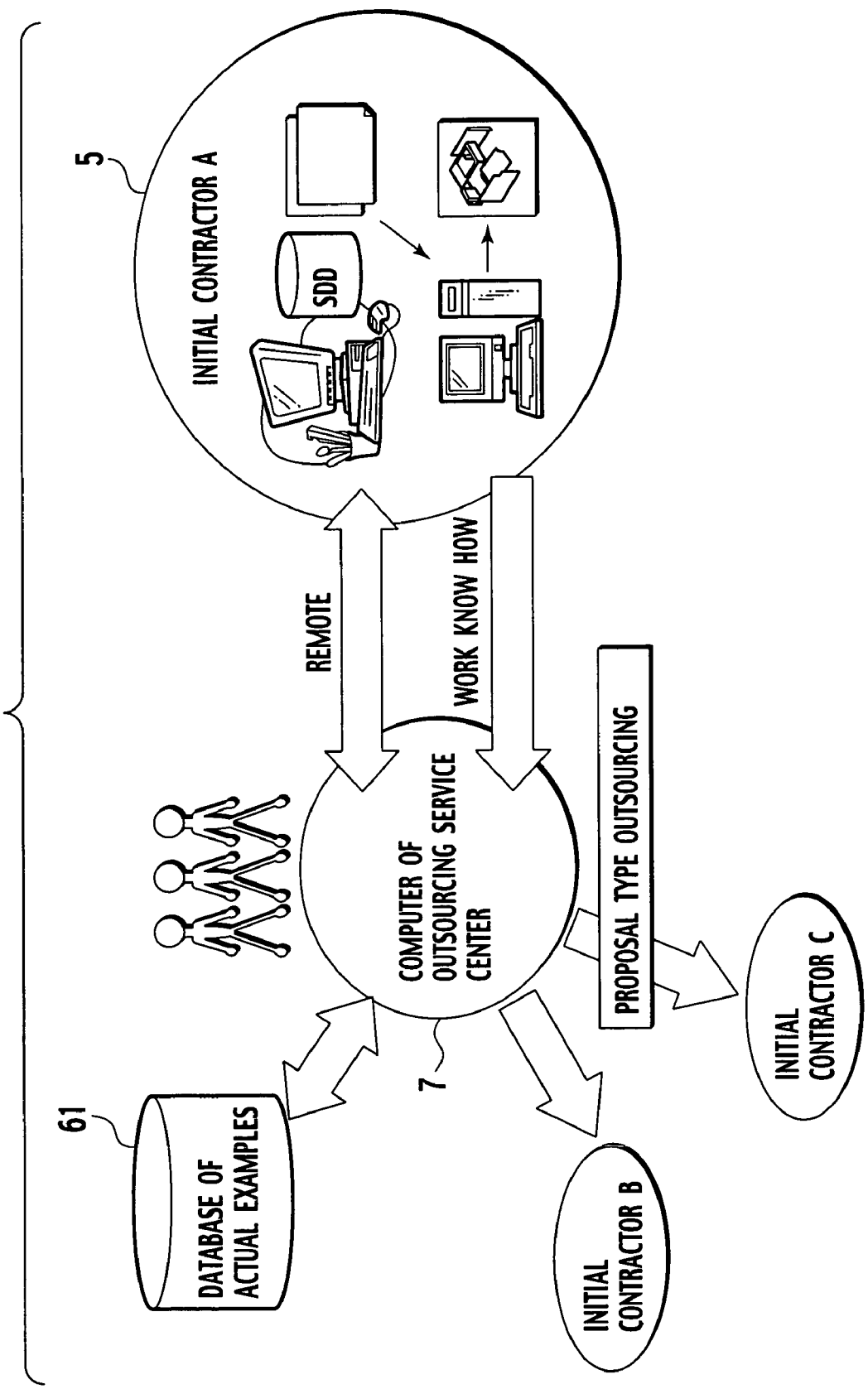
FIG. 20 is an explanatory drawing depicting accumulation of information.

FIG. 20 shows another method of using the processing program edition conferencing system 1 of this example. Here, when the outsourcing service center produces NC data for an initial contractor A for a plurality of NC machine tools (NC processors) to produce a product, the know how of that initial contractor can be accumulated in the database 61 of the computer of the outsourcing center. By referring to examples accumulated in this database 61 the outsourcing service center can provide appropriate CAD/CAM systems for an initial contractor B and an initial contractor C.

While the preferred embodiment of the present invention is shown and described herein, it is to be understood that the present invention is not limited to the above described embodiment, the invention can be put into practice in other configuration suitably modified.

As described, according to this embodiment, by utilizing IT, outsourced services can be performed from a location physically separated by some distance (an outsourcing service center computer), by remote operation of a computer of a customer (an initial contractor), rather than performing those outsourced services at the location of the customer. Accordingly, this has the effect that outsourcing services can be speedily provided to fulfill the work requirements of an initial contractor, such as making an estimate, producing a development drawing, creating a processing program or the like. Further, as the work content performed through the outsourced service can be stored in the memory of the computers of the outsourcing service center and the customer, this has the effect of enabling both those parties to accumulate know how.

Moreover, because the estimates are produced based on detailed data from actual examples, the ordering customer can be provided with a very accurate estimate.

When the order is formally received, the CAD data and CAM data produced during the process of producing the estimate, can be used as it is, thereby minimizing wastage.

What is claimed:

1. A processing program edition conferencing method that enables an initial contractor at a first location that receives a request to manufacture a sheet metal product from a customer at a second location, to virtually examine the manufacturing work for the sheet metal product using a computer of the initial contractor, the method comprising:

the customer at the second location using a computer to send the request to manufacture the sheet metal product together with technical data for sheet metal product production to the computer of the initial contractor at the first location;

the computer of the initial contractor at the first location receiving the request to manufacture the sheet metal product from the customer at the second location;

the computer of the initial contractor at the first location prompting a computer of an outsourcing service center at a third location to login to the computer of the initial contractor at the first location;

the computer of the outsourcing service center at the third location logging into the computer of the initial contractor at the first location, and taking complete remote operational control over the computer of the initial contractor;

the computer of the outsourcing service center at the third location thus logged into the computer of the initial contractor at the first location, remotely operating the computer of the initial contractor based on instructions related to a processing edition conference from the initial contractor, wherein the remote operating includes reviewing the technical data for sheet metal production from the customer and entering plans for the manufacture of the sheet metal product by the initial contractor; and the computer of the initial contractor at the first location transmitting an initial contractor cost estimate to manufacture the sheet metal product and an estimated delivery schedule, based on the entered plans, to the computer of the customer at the second location.

2. The processing program edition conferencing method according to claim 1, wherein the remotely operating the computer of the initial contractor in connection with the processing edition conference includes creating a control program for a NC machine tool for producing the sheet metal product.

3. A processing program edition conferencing method according to claim 1, wherein the remotely operating the computer of the initial contractor in connection with the processing edition conference includes calculating an outsourcing service center estimate of a cost to manufacture the sheet metal product.

4. A processing program edition conferencing method according to claim 1, further comprising:

accumulating data obtained by remotely operating the computer of the initial contractor at the first location in connection with the processing edition conference, in a memory of the computer of the initial contractor at the third location.

5. A processing program edition conferencing method according to claim 1, further comprising:

accumulating data obtained by remotely operating the computer of the initial contractor at the first location in connection with the processing edition conference, in a memory of the computer of the outsourcing service center at the third location.

6. A processing program edition conferencing system that enables an initial contractor at a first location that receives a request to manufacture a sheet metal product from a customer at a second location, to virtually examine the manufacturing work for the sheet metal product using the computer of the initial contractor, said system comprising:

a computer of the customer at the second location configured to send the request to manufacture the sheet metal product together with technical data for sheet metal product production to the computer of the initial contractor a the first location;

the computer of the initial contractor at the first location receiving the request to manufacture the sheet metal product from the customer at the second location;

wherein the computer of the initial contractor at the first location prompts the computer of the outsourcing service center at a third location to login to said computer of the initial contractor;

wherein the computer of the outsourcing service center at the third location logs into the computer of the initial contractor at the first location and takes complete remote operational control over the computer of the initial contractor;

wherein the computer of the outsourcing service center at the third location, logged into the computer of the initial contractor at the first location, remotely operating the computer of the initial contractor based on instructions related to a processing edition conference from the initial contractor, wherein the remote operating includes reviewing the technical data for sheet metal production from the customer and entering plans for the manufacture of the sheet metal product; and wherein the computer of the initial contractor at the first location transmits an initial contractor cost estimate to manufacture the sheet metal product and an estimated delivery schedule, based on the entered plans, to the computer of the customer at the second location.

7. A processing program edition conferencing method according to claim 2, wherein the remotely operating the computer of the initial contractor in connection with the processing edition conference includes calculating an outsourcing service center estimate of a cost to manufacture the sheet metal product.

8. A processing program edition conferencing method according to claim 2, further comprising:

accumulating data obtained by remotely operating the computer of the initial contractor in connection with the processing edition conference, in a memory of the computer of the initial contractor.

9. A processing program edition conferencing method according to claim 3, further comprising:

accumulating data obtained by remotely operating the computer of the initial contractor in connection with the processing edition conference, in a memory of the computer of the initial contractor.

10. A processing program edition conferencing method according to claim 7, further comprising:

accumulating data obtained by remotely operating the computer of the initial contractor in connection with the processing edition conference, in a memory of the computer of the initial contractor.

11. A processing program edition conferencing method according to claim 2, further comprising:

accumulating data obtained by remotely operating the computer of the initial contractor at the first location in connection with the processing edition conference, in a memory of the computer of the outsourcing service center at the third location.

12. A processing program edition conferencing method according to claim 3, further comprising:

accumulating data obtained by remotely operating the computer of the initial contractor at the first location in connection with the processing edition conference, in a memory of the computer of the outsourcing service center at the third location.

13. A processing program edition conferencing method according to claim 4, further comprising:

accumulating data obtained by remotely operating the computer of the initial contractor at the first location in connection with the processing edition conference, in a memory of the computer of the outsourcing service center at the third location.

14. A processing program edition conferencing method according to claim 7, further comprising:

accumulating data obtained by remotely operating the computer of the initial contractor at the first location in connection with the processing edition conference, in a memory of the computer of the outsourcing service center at the third location.

15. A processing program edition conferencing method according to claim 8, further comprising:

accumulating data obtained by remotely operating the computer of the initial contractor at the first location in connection with the processing edition conference, in a memory of the computer of the outsourcing service center at the third location.

16. A processing program edition conferencing method according to claim 9, further comprising:

accumulating data obtained by remotely operating the computer of the initial contractor at the first location in connection with the processing edition conference, in a memory of the computer of the outsourcing service center at the third location.

17. A processing program edition conferencing method according to claim 10, further comprising:

accumulating data obtained by remotely operating the computer of the initial contractor at the first location in connection with the processing edition conference, in a memory of the computer of the outsourcing service center at the third location.

* * * * *